United States Patent
Beale et al.

(10) Patent No.: US 12,425,902 B2
(45) Date of Patent: Sep. 23, 2025

(54) MOBILE TERMINAL, NETWORK NODE, SYSTEM AND METHODS

(71) Applicant: Sony Group Corporation, Tokyo (JP)

(72) Inventors: Martin Warwick Beale, Stuttgart (DE); Kazuyuki Shimezawa, Stuttgart (DE); Shin Horng Wong, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 393 days.

(21) Appl. No.: 17/792,708

(22) PCT Filed: Feb. 11, 2021

(86) PCT No.: PCT/EP2021/053365
§ 371 (c)(1),
(2) Date: Jul. 14, 2022

(87) PCT Pub. No.: WO2021/160755
PCT Pub. Date: Aug. 19, 2021

(65) Prior Publication Data
US 2023/0059750 A1   Feb. 23, 2023

(30) Foreign Application Priority Data

Feb. 13, 2020 (EP) .................. 20157272

(51) Int. Cl.
*H04W 24/10* (2009.01)
*H04L 1/00* (2006.01)
*H04L 5/00* (2006.01)

(52) U.S. Cl.
CPC ......... *H04W 24/10* (2013.01); *H04L 1/0003* (2013.01); *H04L 1/0009* (2013.01); *H04L 1/0026* (2013.01); *H04L 5/0055* (2013.01)

(58) Field of Classification Search
CPC .... H04W 24/10; H04L 1/0003; H04L 1/0009; H04L 1/0026; H04L 5/0055
See application file for complete search history.

(56) References Cited

U.S. PATENT DOCUMENTS 9,591,657 B2  3/2017 Ji et al.
2009/0247181 A1 10/2009 Palanki
(Continued)

OTHER PUBLICATIONS

International Search Report and Written Opinion mailed on May 11, 2021, received for PCT Application PCT/EP2021/053365, filed on Feb. 11, 2021, 13 pages.
(Continued)

*Primary Examiner* — Jamal Javaid
(74) *Attorney, Agent, or Firm* — XSENSUS LLP

(57) ABSTRACT

A method of detecting interference in a mobile telecommunications network, the mobile telecommunications network comprising a mobile terminal and a network node providing a wireless access interface to at least the mobile terminal. The method comprises the mobile terminal performing measurements of interference on one or more frequency resources of the wireless access interface; based on the measurements, the mobile terminal determining that the measured interference comprises time-limited interference by determining whether the measured interference comprises interference limited in time; upon determining that the measured interference comprises time-limited interference, the mobile terminal reporting to the network node the detection of the time-limited interference; the network node receiving a report of the time-limited interference detection from the mobile terminal; and the network node taking a remedial action based on receiving the report of the time-limited interference detection.

19 Claims, 7 Drawing Sheets

(56) References Cited

U.S. PATENT DOCUMENTS

| | | | |
|---|---|---|---|
| 2013/0176877 A1* | 7/2013 | Sadek | H04W 16/14 |
| | | | 370/252 |
| 2014/0198872 A1 | 7/2014 | Barriac et al. | |
| 2016/0143043 A1 | 5/2016 | Chendamarai Kannan et al. | |
| 2017/0034728 A1* | 2/2017 | Zhang | H04W 24/02 |
| 2018/0295637 A1 | 10/2018 | Manolakos et al. | |
| 2019/0372709 A1 | 12/2019 | Chendamarai Kannan et al. | |

OTHER PUBLICATIONS

Nokia et al., "Revised SID: Study on NR Industrial Internet of Things (IoT)", 3GPP TSG RAN meeting #81, RP-182090, Sep. 10-13, 2018, 5 pages.

Holma et al., "LTE for UMTS OFDMA and SC-FDMA Based Radio Access", John Wiley & Sons, 2009, 232 pages.

3GPP, "5G; NR; Medium Access Control (MAC) protocol specification (3GPP TS 38.321 version 15.3.0 Release 15)", ETSI TS 138 321 V15.3.0, Sep. 2018, pp. 1-77.

3GPP, "NR; Physical layer procedures for data (Release 16)", 3GPP TS 38.214 V16.0.0, Dec. 2019, pp. 1-147.

NTT Docomo, Inc., "Revised WID on New Radio Access Technology", 3GPP TSG RAN Meeting #78, RP-172834, Dec. 18-21, 2017, 11 pages.

Huawei et al., "New SID on Physical Layer Enhancements for NR Ultra-Reliable and Low Latency Communication (URLLC)", 3GPP TSG-RAN#81, RP-182089, Sep. 10-13, 2018, 5 pages.

* cited by examiner

MOBILE TERMINAL, NETWORK NODE, SYSTEM AND METHODS

CROSS-REFERENCE TO RELATED APPLICATIONS

The present application is based on PCT filing PCT/EP2021/053365, filed Feb. 11, 2021, which claims the Paris Convention priority of European patent application EP 20157272.4, filed Feb. 13, 2020, the contents of each of which are hereby incorporated by reference.

FIELD

The present disclosure relates to mobile terminals, network nodes, systems and methods for detecting time-limited interference in a wireless communications network.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example, it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

An example of such a new service is referred to as an Ultra Reliable Low Latency Communications (URLLC) service which, as its name suggests, requires that a data unit or packet be communicated with a high reliability and with a low communications delay. URLLC type services therefore represent a challenging example for both LTE type communications systems and 5G/NR communications systems.

PCT application PCT/EP2017/071636, published as WO2018050431 and entitled "Wireless telecommunications apparatus and methods" provides a discussion of low latency transmissions (e.g. URLLC transmissions) that may be of interest to the skilled reader.

The increasing use of different types of communications devices associated with different traffic profiles gives rise to new challenges for efficiently handling communications in wireless telecommunications systems that need to be addressed.

SUMMARY

The present invention is defined in the appended claims.

According to a first example of the present disclosure, there is provided a method of operating a mobile terminal in a mobile telecommunications network, the mobile telecommunications network comprising the mobile terminal and a network node providing a wireless access interface to at least the mobile terminal. The method comprises the mobile terminal performing measurements of interference on one or more frequency resources of the wireless access interface; based on the measurements, determining that the measured interference comprises time-limited interference by determining whether the measured interference comprises interference limited in time; upon determining that the measured interference comprises time-limited interference, reporting to the network node the detection of the time-limited interference.

According to a second example of the present disclosure, there is provided a method of operating a network node in a mobile telecommunications network, the mobile telecommunications network comprising a mobile terminal and the network node, the network node providing a wireless access interface to at least the mobile terminal. The method comprises the network node receiving a report of time-limited interference detection from the mobile terminal, the time-limited interference corresponding to interference limited in time; and taking a remedial action based on receiving the report of time-limited interference detection.

According to a third example of the present disclosure, there is provided a method of detecting interference in a mobile telecommunications network, the mobile telecommunications network comprising a mobile terminal and a network node providing a wireless access interface to at least the mobile terminal. The method comprises the mobile terminal performing measurements of interference on one or more frequency resources of the wireless access interface; based on the measurements, the mobile terminal determining that the measured interference comprises time-limited interference by determining whether the measured interference comprises interference limited in time; upon determining that the measured interference comprises time-limited interference, the mobile terminal reporting to the network node the detection of the time-limited interference; the network node receiving a report of the time-limited interference detection from the mobile terminal; and the network node taking a remedial action based on receiving the report of the time-limited interference detection.

According to a fourth example of the present disclosure, there is provided a mobile terminal for use in a mobile telecommunications network, the mobile telecommunications network comprising the mobile terminal and a network node providing a wireless access interface to at least the mobile terminal. The mobile terminal is configured to communicate with the network node via the wireless access interface and is configured to: perform measurements of interference on one or more frequency resources of the wireless access interface; based on the measurements, determine that the measured interference comprises time-limited interference by determining whether the measured interference comprises interference limited in time; upon determining that the measured interference comprises time-limited interference, report to the network node the detection of the time-limited interference.

According to a fifth example of the present disclosure, there is provided a network node for use in a mobile telecommunications network, the mobile telecommunications network comprising a mobile terminal and the network node. The network node is configured to provide a wireless access interface to at least the mobile terminal and is further configured to receive a report of time-limited interference detection from the mobile terminal, the time-limited interference corresponding to interference limited in time; and take a remedial action based on receiving the report of time-limited interference detection.

According to a sixth example of the present disclosure, there is provided a system for detecting interference in a mobile telecommunications network, the mobile telecommunications network comprising a mobile terminal and a network node providing a wireless access interface to at least the mobile terminal. The system comprises at least the mobile terminal and the network node. The mobile terminal is configured to perform measurements of interference on one or more frequency resources of the wireless access interface; based on the measurements, determine that the measured interference comprises time-limited interference by determining whether the measured interference comprises interference limited in time; and upon determining that the measured interference comprises time-limited interference, report to the network node the detection of the time-limited interference. The network node is configured to receive a report of the time-limited interference detection from the mobile terminal; and take a remedial action based on receiving the report of the time-limited interference detection.

Respective aspects and features of the present disclosure are defined in the appended claims.

It is to be understood that both the foregoing general description and the following detailed description are illustrative only and are not restrictive, of the techniques and teachings of the present disclosure. While the present disclosure includes example arrangements falling within the scope of the claims, it may also include example arrangements that do not necessarily fall within the scope of the claims but which are then useful to understand the teachings and techniques provided herein.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF EXAMPLES

Long Term Evolution Advanced Radio Access Technology (4G)

Figure 1:
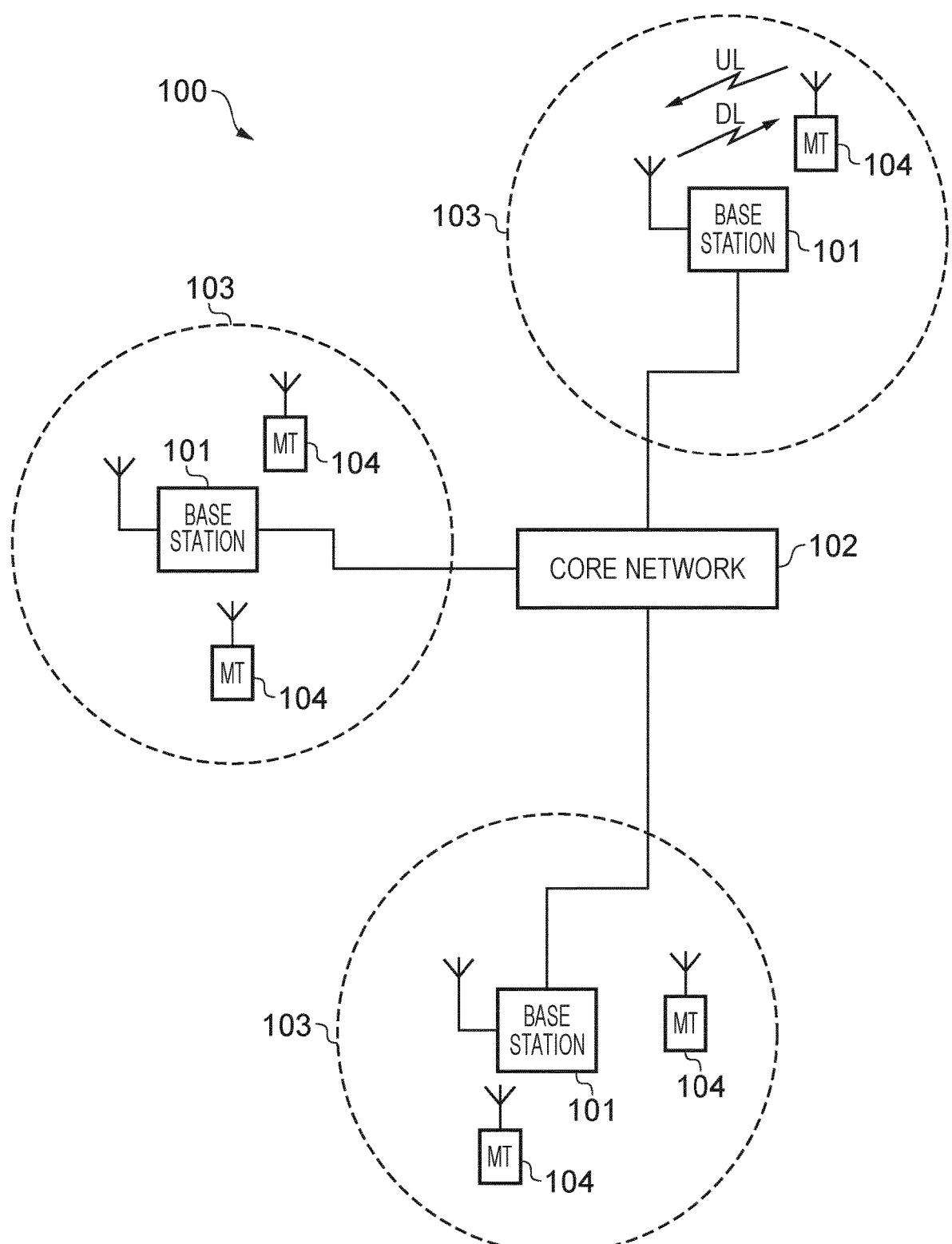
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on.

Communications devices may also be referred to as mobile stations, mobile terminals (MT), user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
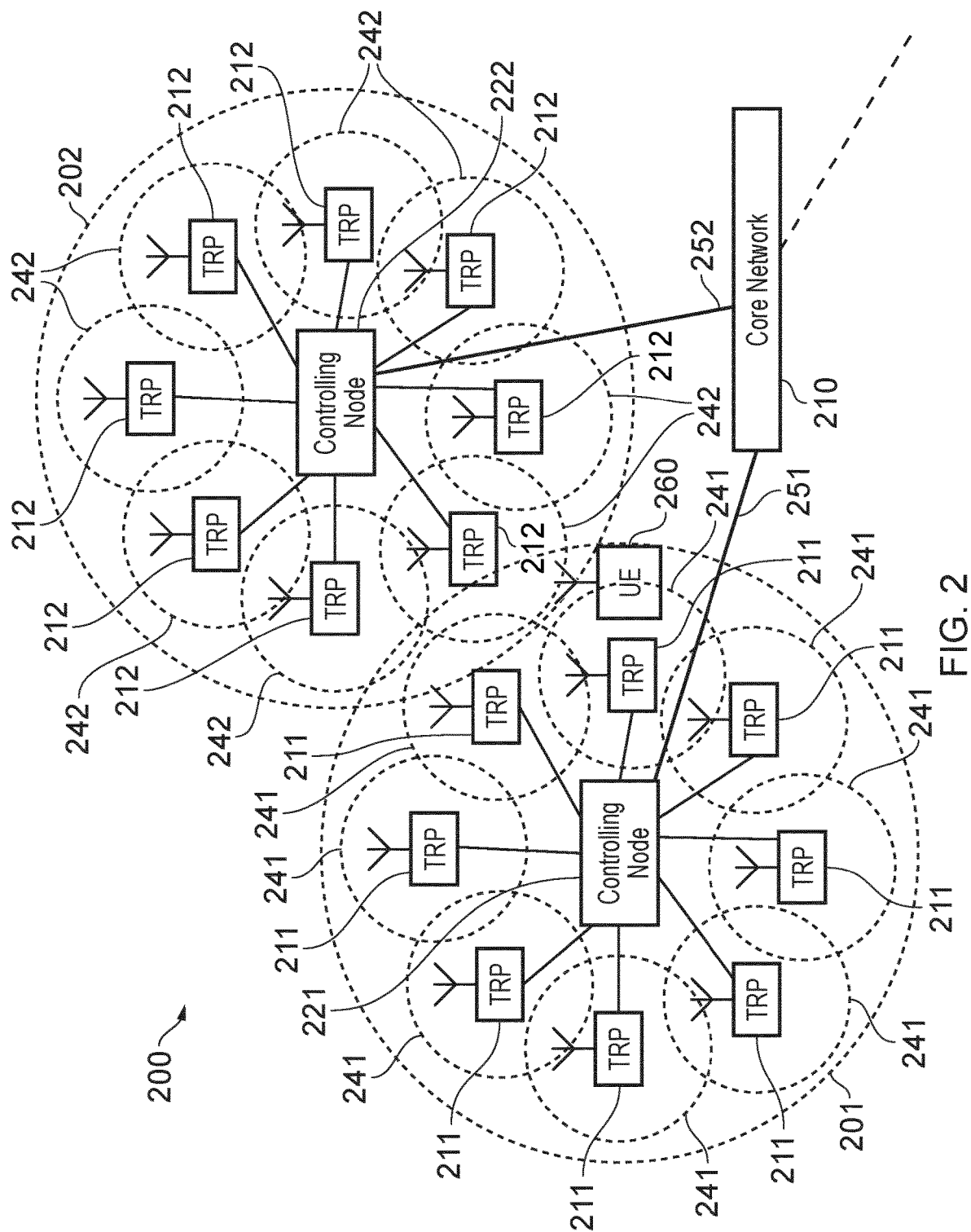
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/ remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or mobile terminal or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/ access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
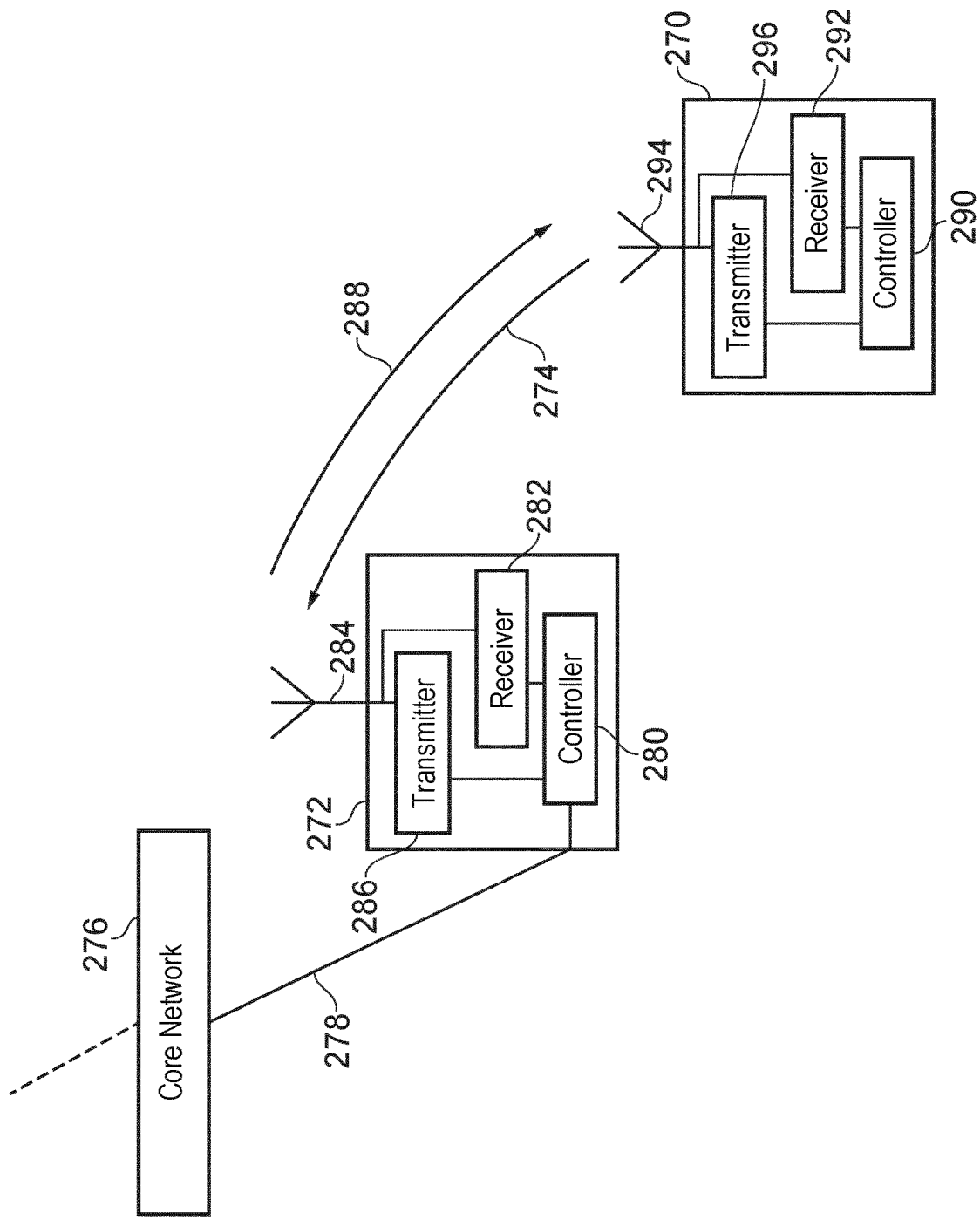
FIG. 3 is a schematic block diagram of an example infrastructure equipment and communications device which may be configured in accordance with example embodiments.

A more detailed illustration of a UE/communications device 270 (which may correspond to a communications device such as the communications device 260 of FIG. 2 or the communications device 104 of FIG. 1) and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via uplink resources of a wireless access interface as illustrated generally by an arrow 274 from the UE 270 to the infrastructure equipment 272. The UE 270 may similarly be configured to receive downlink data transmitted by the infrastructure equipment 272 via downlink resources as indicated by an arrow 288 from the infrastructure equipment 272 to the UE 270. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

5G, URLLC and Industrial Internet of Things

Systems incorporating NR technology are expected to support different services (or types of services), which may be characterised by different requirements for latency, data rate and/or reliability. For example, two particular types of services have been defined as desired NR functionalities:

Enhanced Mobile Broadband (eMBB)
Ultra Reliable & Low Latency Communications (URLLC)

Figure 4:
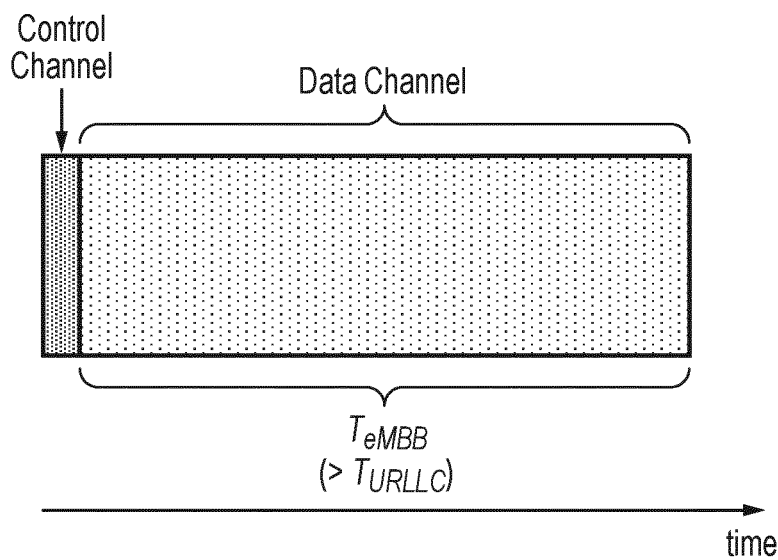
FIG. 4 illustrates an example frame structure for an eMBB transmission.

Enhanced Mobile Broadband (eMBB) services are characterised by high capacity with a requirement to support up to 20 Gb/s. For efficient transmission of large amounts of data at high throughput, eMBB is likely to use slot-based transmissions to minimise the overhead used. An example eMBB frame structure in the downlink is shown in FIG. 4 with transmission period $T_{eMBB}$, where the control channel uses fewer transmission resources than the data channel.

Figure 5:
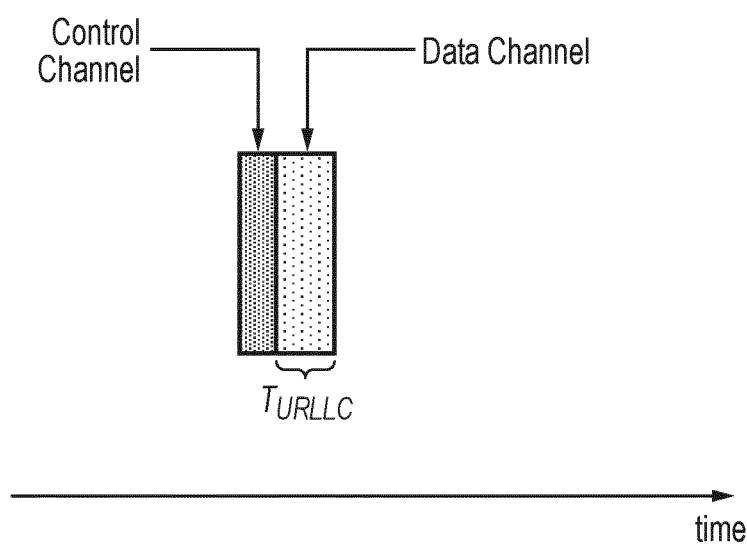
FIG. 5 illustrates an example frame structure for an URLLC transmission.

An important requirement for URLLC is low latency measured from the ingress of a layer 2 packet to its egress from the network, with a proposed target of 1 ms. The URLLC data is expected to be short and hence short scheduling times are desirable, where the control and data transmissions have a short duration. As a result, the URLLC transmissions use a frame duration that is less than that of the eMBB frame. For example, while a typical eMBB frame duration is 1 ms, a URLLC frame structure can use a much shorter transmission period $T_{URLLC}$ (for example 0.25 ms). FIG. 5 illustrates an example frame structure for a URLLC transmission. As a result, the control and data channels occupy a smaller time period (i.e. the transmission period of URLLC $T_{URLLC}$ is smaller than that of eMBB $T_{eMBB}$). While the relative overhead is expected to be greater with URLLC transmissions, the URLLC transmissions are also associated with shorter latency performance (i.e. a better performance with less latency), compared to eMBB transmissions.

The desired targets for URLLC services also include a reliability of $1-10^{-5}$ (99.999%) or higher for one transmission of a 32 byte packet with a user plane latency of 1 ms [3]. In some scenarios, there may be a requirement for a reliability of $1-10^{-6}$ (99.9999%) or higher with either 0.5 ms or 1 ms of user plane latency.

Massive Machine Type Communications (mMTC) is another example of a service which may be supported by NR-based communications networks.

In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network. This use case is sometimes referred to as Industry 4.0.

Industrial environments can be hostile to wireless communications due to Radio frequency (RF) interference generated within the factory. For example, RF interference can be created due to rotating electrical machinery, arc-welding, processes involving ionising radiation, etc. In some cases, this interference is short-lived, lasting for a duration of the order of one or a few milliseconds. In other cases, the interference is constant and in the background. Short-lived interference is difficult for a communication system to deal with. This is even more of a problem when the communication system implements a control or feedback loop.

For example, RF interference is usually expected to have an effect on a Channel Quality Indicator (CQI). As many telecommunications system implement or are expected to implement a CQI outer loop, short-lived interference can have undesirable effects on the CQI outer loop.

In many communication systems (e.g. HSPA, LTE, NR), the UE sends channel quality information to the base station (e.g. BTS, NodeB, eNB, gNB, etc.) allowing the base station to track fast fading and apply a suitable modulation and coding scheme in the downlink. The channel and hence the reported channel information can thus be affected by short-lived interference.

The CQI can be signalled from the UE to the base station as a preferred modulation and coding scheme (MCS). The signalled preferred MCS typically relates to the MCS that would result in a target block error rate (BLER) if that MCS were applied by the base station. The CQI is generally determined by the UE based on the Signal-to-Noise Ratio (SNR) or Signal-to-Noise plus Interference Ratio (SINR) observed at the UE. The UE would typically implement a look up table mapping measured SNR or SINR to reported CQI.

The UE implementation for CQI is typically complex and it can be very difficult to create an implementation that can accurately determine an optimal MCS to achieve a BLER of 10% over many different channel models.

Additionally, the CQI specification relates to the MCS that would be required to achieve a 10% BLER. However the base station may wish to operate at a different BLER target. For example, the base station may wish to operate at a BLER target of 0.1% or lower for URLLC use cases.

Moreover, in addition to sending channel quality information (e.g. CQI), the UE also sends ACK/NACK information related to downlink transmissions (typically a Physical Downlink Shared Channel "PDSCH") that it receives. Short-lived interference can also affect downlink transmissions and thus whether the UE will send an ACK or NACK message in response to a downlink transmission from the base station.

Example Impact of Time-Limited Interference—CQI Outer Loop

Based on the above discussion, it is apparent that there are many cases where the base station cannot necessarily rely too heavily on the CQI report from the UE in order to choose an MCS for downlink transmissions. Two example situations include an imperfect UE implementation (which leads to CQI reporting which may not correspond to what the base station would normally expect from a terminal in this situation) or a BLER target for the base station that is different to BLER target assumed at the UE.

In order to try to cater for the above imperfections, the base station would typically implement a "CQI outer loop". The CQI outer loop is a control loop or feedback loop that controls the MCS applied to downlink transmissions based on the reported CQI and on the ACK/NACK feedback (or hybrid automatic repeat request system "HARQ" feedback) from the UE.

Figure 6:
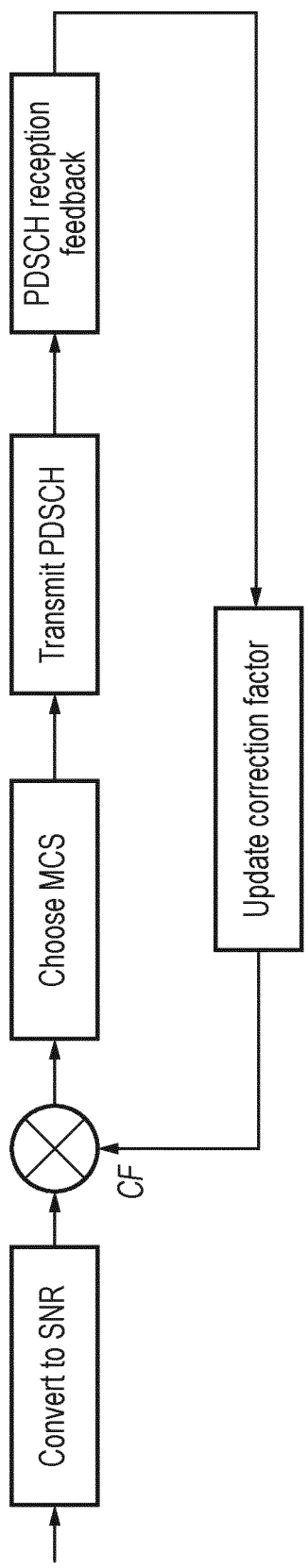
FIG. 6 illustrates an example CQI outer loop in a base station.

An example of a CQI outer loop, as implemented in a base station and a UE, is shown in FIG. 6. The actual implementation of CQI outer loop functionality is not currently specified in standard documents.

In other words, this function is implementation dependent and may vary from one base station to another. Hence FIG. 6 is just one possible implementation of a CQI outer loop, if provided.

The functionalities of elements within the CQI outer loop of FIG. 6 are described below:
  Convert to SNR: the base station receives a CQI report from the UE (which can be considered to be an indication of an MCS expected by the UE to be required to achieve a 10% BLER). The base station can convert that CQI report into a corresponding SNR. The conversion could be implemented through the use of a look up table (of CQI value vs SNR).

It is noteworthy that the UE can send periodic and/or aperiodic CQI reports, depending on configuration from the base station.
  Correction (illustrated as a circle with a cross inside in FIG. 6): the SNR value is corrected by a correction factor, CF, to produce a corrected SNR. An example correction function would produce a corrected SNR as:

$$SNR_{corrected} = SNR_{in} \times CF$$

Choose MCS: an MCS for a PDSCH transmission is chosen, based on $SNR_{corrected}$. The choice of MCS based on SNR could be made, for example, by use of a look up table.
  Transmit PDSCH: the PDSCH is transmitted by the base station using the MCS determined in the previous step.
  PDSCH reception feedback: the UE receives the PDSCH and sends an ACK or NACK to the base station, for example via the PUCCH. An ACK will indicate a successful transmission (of the PDSCH) while a NACK will indicate an unsuccessful transmission.
  Update correction factor: the base station updates the correction factor, based on ACK or NACK status for previous downlink transmissions. For example:
    NACK received: if the PDSCH had been NACKed, it would indicate that the MCS chosen had been too optimistic. $SNR_{corrected}$ should have been lower, leading to a lower applied MCS. Hence the correction factor can be reduced.
    ACK received: if the PDSCH had been ACKed, it would indicate that the MCS chosen had been too pessimistic. $SNR_{corrected}$ should have been higher, leading to a higher applied MCS. Hence the correction factor can be increased.

From one perspective, the CQI outer loop can be seen as attempting to control the correction factor (and hence the applied MCS) with a view to operating at the expected BLER taking into account the varying SNR conditions.

One method of varying the correction factor, CF, includes using a step size parameter, $CF_{step}$, and applying the following updates to the correction factor, based on the ACK/NACK status reported by the UE and on a parameter n:

$$NACK: CF_{new} = CF_{old} - CF_{step}$$

$$ACK: CF_{new} = CF_{old} + CF_{step}/(n-1)$$

In a steady and stable environment, these updates are expected to lead to BLER=1/n being achieved.

Figure 7:
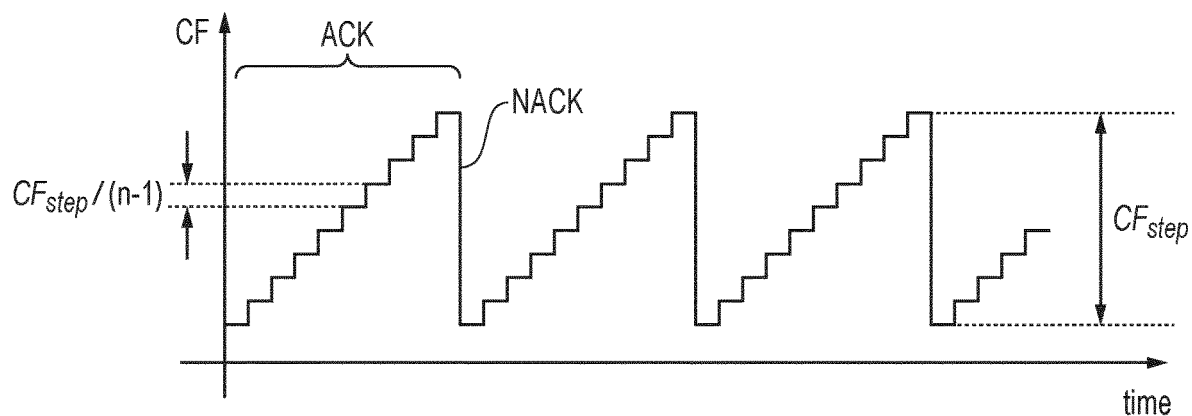
FIG. 7 illustrates an example variation of a Correction Factor "CF" in a CQI outer loop.

FIG. 7 illustrates an example variation with time of a Correction Factor "CF" in a CQI outer loop using the example algorithm described above. This illustrative example is for a BLER target of 10% (such that n=10 in the algorithm above). As can be observed in this example, a negative acknowledgement can have a significant effect that is proportionally much greater on the overall correction factor and control of the transmission parameters than positive acknowledgement.

Although FIGS. 6 and 7 are illustrative example, it is generally expected that implementations of terminals and base stations will result in an arrangement where an unsuccessful transmission will generally result in a correction of a greater amplitude or strength than when a transmission has been successful.

However, if errors are not related to the general MCS/SNR conditions (e.g. but to time limited interference), then changing the correction factor may not be optimal and may be undesirable. For example, the reason for receiving a NACK in response to a downlink transmission may not related to a mismatch or sub-optimal correspondence between the MCS and SNR. Possibly, if it wasn't for the short-lived interference, the transmission parameter would be found to be generally well adapted to the radio environment and to the desired transmission quality or parameters. However, if the correction factor is driven down and if the MCS is selected as a low MCS as a result, the UE may only receive transmissions scheduled with an unnecessarily low MCS.

There are different reasons why there may be a NACK that is received which does not relate to SNR conditions, or at least not fully:

A UE hardware fault means that the PDSCH cannot be decoded (e.g. if the UE processing capability is not sufficient to decode the PDSCH in time, a NACK may be sent by the UE).

Time-limited Interference on the radio channel (such as interference spikes caused by factory machinery, as described above) causes the PDSCH to be undecodable. The CQI outer loop algorithm should not adapt to these worst case interference conditions.

As a result, time limited interference, may have a negative effect on the configuration of transmission parameters for communications between the base station and a terminal (on the downlink and/or uplink) which may not necessarily be justified or proportionate to the circumstances.

In this example, it is noteworthy that the degradation is expected to be even more significant when the CQI outer loop operates at low BLER targets. When the CQI outer loop operates at a BLER target that is significantly higher than the probability of an interference event (e.g. the BLER target for random SNR-related errors is higher than the block error rate for interference-induced events), the CQI outer loop is not significantly perturbed by the interference-induced events. On the other hand, in the case of URLLC transmissions, the communication system operates at a low BLER target for URLLC transmissions. In some examples, the URLLC transmissions may be expected to be in the region of BLER=0.1% for initial transmissions and also possibly BLER=0.001% after re-transmissions. In such a case, the operation of a CQI outer loop (such as the one discussed above), is expected to be more greatly affected in the presence of interference-induced events. Accordingly, time-limited interference can have a greater negative impact on URLLC transmissions than on other types of transmissions, e.g. transmissions that operate with a higher BLER target.

In accordance with the present disclosure, at least two forms of interference: time-limited interference and background interference are discussed:

Time-limited interference has been discussed above and generally refers to interference on a relatively short timescale. For example, it can be interference that is of the order or 1 ms, such as interference which affects the transmissions for any duration of less than 5 ms, for example less than 4 ms, 3 ms, 2 ms or 1 ms.

Background interference also occurs in a cellular system, where the background interference is generally caused by cellular transmissions in other cells, for example neighbouring cells. With appropriate signal design (as is the case in 3GPP systems), this background interference appears as noise. Generally background interference corresponds to interference on a relatively longer timescale, for example interference which affects the transmissions for a duration of at least 10 ms, for example at least 25 ms, 50 ms, 100 ms or longer. This type of interference is generally expected to be less variable and more spread out in time.

This above example illustrates how short-lived or time-limited interference can have a negative impact on a telecommunication system and how it has been identified that, with current systems, such time limited interference can cause a mobile telecommunications system to make adjustments to radio transmission parameters which may not be desirable when the interference experienced is limited in time rather than of a background type.

The measurement methods for current mobile networks are for measuring a level of background noise or interference and do not enable the mobile terminal or any other network node to identify whether a portion of interference experienced at a point in time is likely to be limited in time. It is also noteworthy that interferences coming from different sources will be received collectively at the mobile terminal. For example, a terminal experiencing time-limited interference will also likely experience background noise at the same time and the two types of interference will be received as one. It is challenging for the terminal to determine the different components of the interference, let alone the source of the components.

Current measurement methods can for example involve measuring a signal-to-interference-plus-noise ratio (SINR) which will measure all types of interference without distinction, treating everything as background noise. Measuring all interference without trying to identify a time dimension of the interference experienced is however not suitable for determining whether any of the measured interference is due to time-limited interference or due to long term interference.

As the skilled person will appreciate, interference can in theory be of any duration or strength. However, in accordance with the present disclosure and with the techniques proposed herein, at least two different interference categories can be used to model the type of interference experienced. In particular, conventional mobile networks assume that interference will be mostly experienced as background noise and as such there is no determination or assessment of the interference to determine whether the interference is background noise or time-limited interference. In other words, the terminal will not make any determination regarding the expected duration of the interference. Accordingly, and in accordance with techniques of the present disclosure, when determining transmission parameters, an additional type or category of interference experienced can be taken into account, wherein the type of interference is determined by making an assessment regarding the expected duration of at least some of the interference received. It is thereby expected that the overall performance of the mobile telecommunication network will generally be improved.

Time-Limited Interference Management Techniques

As described above, CQI outer loop functionality can be severely degraded when there is interference. More generally, mobile networks have historically been designed to be more efficient at handling background or longer term interference levels and can therefore sometimes operate in a less than optimal manner when experiencing short lived or time limited interference.

The techniques discussed herein are provided with a view to improving mobile network behaviour when time-limited interference is experienced.

Figure 8:
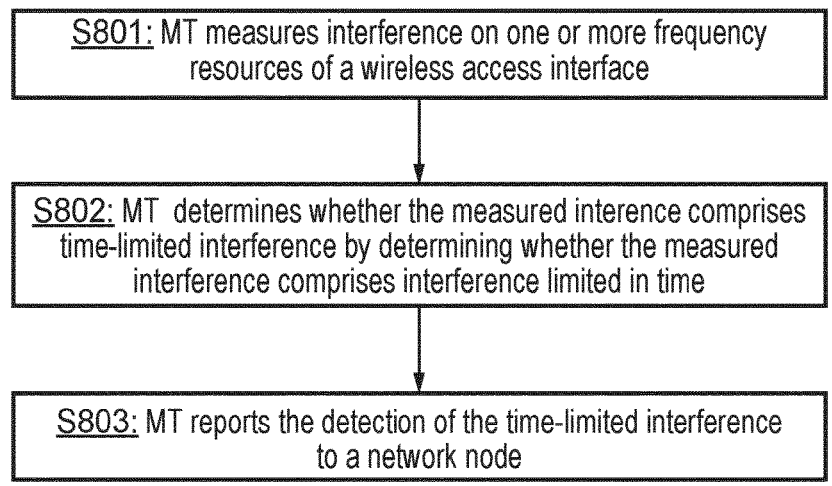
FIG. 8 illustrates an example method of detecting time-limited interference.

FIG. 8 illustrates an example method in accordance with the teachings of the present disclosure. According to this first example, there is provided a method of reporting interference in a mobile telecommunications network, the mobile telecommunications communication network comprising a mobile terminal and a network node providing a wireless access interface to at least the mobile terminal. The method comprises the mobile terminal performing measurements of interference on one or more frequency resources of the wireless access interface (S801).

Then, based on the measurements, the mobile terminal can determine (S802) that the measured interference comprises time-limited interference by determining whether the measured interference comprises interference limited in time. In other words, the mobile terminal can make a determination regarding whether the measured interference comprises a component that only had an effect on the overall interference for a limited time. Actively identifying the timescale on which the interference occurs, rather than treating all interference collectively and in the same way, enables the mobile terminal to detect additional interference information—which can then be used to make a more informed decision. This can be done by using techniques that are for detecting interference on a particular timescale or by detecting events that are indicative of short-lived interference, as discussed below (see the examples numbered as 1). Accordingly, the mobile terminal can for example treat short lived interference differently from background noise.

Upon determining that that the measured interference comprises time-limited interference, the mobile terminal can report the detection of the time-limited interference to the network node (S803).

In a system where the terminal also reports (directly or indirectly) on a level of background noise experienced, the reporting of the short-lived interference detection can be done differently from the reporting of the background noise, for example in terms of reporting method and/or timing or can be done using a similar reporting technique. Reporting aspects are further discussed in examples below (see the examples numbered as 2).

Accordingly, the mobile terminal can report to the base station—and/or any other suitable network node—when it observes time-limited interference. The base station can then take this information on the presence of time-limited interference into account when choosing the method for future communications with the mobile terminal (UE), for example for determining one or more downlink and/or uplink parameters (see the examples numbered as 3).

In the following description, three different aspects associated with the present disclosure will be discussed, namely:
1. How the UE determines whether there is time-limited interference.
2. How the UE signals to the base station (or network node) that it has detected what it believes to be time limited interference.
3. What the base station (or network node) does if time-limited interference has been detected and reported.

While these aspects have been discussed separately, the skilled person will appreciate that they might be combined in any suitable way. It will also be appreciated that some combinations of implementation choices for each of these aspects may be more beneficial than other combinations in some circumstances. For example, the type of remedial action may depend on how the terminal was able to determine that the interference is limited in time and/or on how it was reported (whether this is for example based on whether the terminal had a choice in the reporting method and/or on characteristics of the reporting method).

It is also noteworthy that a system in accordance with the present disclosure may implement more than one of these example techniques. For example, a mobile terminal may implement two or more detection techniques to determine that interference is limited in time and try to reduce the risk of a false positive.

Item 1. Time-Limited Interference Detection—Determination that Interference is Limited in Time.

Example 1A: Noise Measurement

In conventional systems and as part of the UE decoder signal processing functionality, the UE will typically measure the noise level of the received signal. This noise measurement is done in addition to the signal to noise ratio measurements, which can be used for example for log-likelihood ratio estimation. The noise measurement can be used by the UE to set thresholds for demodulating modulation symbols.

The average noise level in the modem will depend on noise created in the receiver amplifier circuitry of the UE, on noise due to the Analogue Digital Conversion (ADC) sampling process, background interference (due to overlapping cells), etc. and as such is expected to remain reasonably static or stable.

Figure 9:
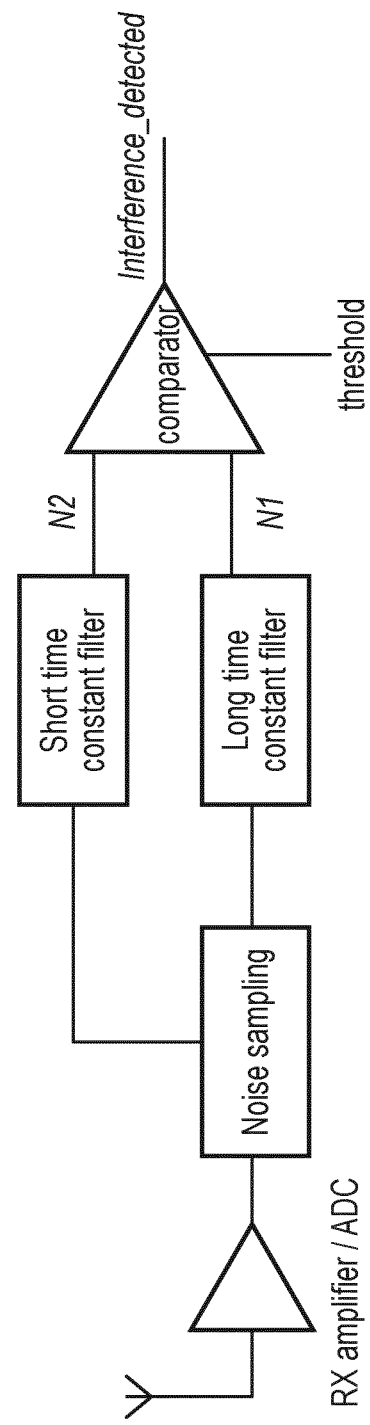
FIG. 9 illustrates an example arrangement for detecting time-limited interference.

In this example, the UE can detect time-limited interference by observing a sudden change in the measured noise level. FIG. 9 illustrates an example arrangement for detecting time-limited interference. As illustrated in FIG. 9, a detection module may comprise:

RX amplifier/ADC: these are used to receive the over the air signal. The amplification and ADC sampling functions usually result in additional noise in the signal output.

Noise sampling: DSP functionality within the UE determines or assesses an instantaneous noise level N.

Long time constantfilter: Noise samples are filtered with a long time constant in order to create a measurement of the long term average noise level, N1. N1 can for example correspond to an average noise level for a time period T1. From a different perspective, at any time $t_0$, $N1(t_0)$ is based on or corresponds to the average value for the values of N(t) for the time range $[t_0-T1;t_0]$.

Short time constant filter: Noise samples are filtered with a short time constant in order to create a measurement of short-term noise/interference, N2. N2 can for example correspond to an average noise level for a time period T2, where T2 is shorter than T1. In one example, T1 could be of about 1 ms and T2 of about 100 ms. In other examples, T1 could be selected between 0.1 ms and 10 ms and T2 between 50 ms and 1 s. Alternatively or additionally, the T1/T2 ratio may be between 1/10 and 1/1000, for example between 1/50 and 1/200. From a different perspective, at any time $t_0$, $N2(t_0)$ is based on or corresponds to the average value for the values N(t) for the time range $[t_0-T2;t_0]$.

Comparator: based on a threshold, the comparator determines whether the short term noise level, N2, is larger than the long term noise level, N1, by more than a threshold amount. Said differently, it can determine that short-lived interference has been determined (e.g. output a signal 'interference_detected') if N2-N1>threshold.

In a related example based on noise measurements, a static value may be used for the reference noise level N1. This fixed value may be programmed into the UE by a UE manufacturer or the like, e.g. according to UE implementation choices. The UE implementer can for example set performance requirements on the noise generated by the RX amplifier and ADC sampling functions and determine an expected "normal" or "reference" noise level for the UE, based on these performance requirements, thereby setting parameter N1 for the UE.

In other cases, the time-limited interference detection or measurement can be calculated based on one or more of: periodical measurements (e.g. every few milliseconds, slots or subframes; hours; days; etc.), measurements on request, and/or event-based measurements (e.g. based on a restart event, on a new connection being established, on a connection to a new cell, etc.).

Additionally, the reference noise level may also be based on a combination of a reference value (e.g. as set by the UE implementer or manufacturer) and one or more noise measurements.

Example 1B: SNR/LLR Measurement

In current systems and as mentioned above, the UE measures a Signal-to-Noise Ratio "SNR" and uses the SNR when determining Log Likelihood Ratios "LLRs". The LLRs are soft decisions that are used in the decoding process when attempting to decode a received symbol.

The SNR/LLR calculation processes in the UE are dependent in particular on two aspects: the signal level and the noise level. When there is random noise or background interference, the noise level is fairly constant. The signal level changes according to channel conditions and will track the fast fading profile of the channel. Hence during fades on the channel, the measured SNR will decrease and/or the average LLR magnitudes will decrease.

When there is time-limited interference, the SNR and average LLR magnitudes will likewise be affected: the SNR is expected to decrease and the LLR magnitudes are also expected to decrease. In this case, this negative impact will be due to an increase in interference rather than a reduction in signal level received at the terminal. It can thus be challenging to differentiate between the two types of events.

In an example of the present disclosure, the UE can determine that there is time-limited interference when the rate of change of SNR and/or average LLR magnitude is greater than an expected rate of change of SNR/an expected average LLR magnitude, where the expected rate of change of SNR or expected average LLR magnitude is measured (and for example averaged) over a longer time period (for example of the order of 100 ms or more). This is because it is expected that the rate of change of SNR and/or average LLR magnitude in a time-limited interference event can be different than the rate of change of SNR and/or average LLR magnitude due to fast fading.

It is pointed out that the discussion regarding example values for T1 and T2 above can provide helpful teachings regarding the time scale and/or relative time scale for comparing average SNR change rate and/or average LLR magnitude change rate with the corresponding current SNR change rate and/or current LLR magnitude change rate.

As above, the reference rate of change for SNR and/or average LLR magnitude can be based on one or more of a predetermined reference value, a received value, a measured value, etc.

Also, the measured rate of change may be compared to the reference value taking into account of a threshold. For example, short-lived interference may be detected when the rate of change is greater than the reference value by at least a threshold ($R_{[estimated]} > R_{[ref]}$+threshold). The threshold may be pre-configured, for example by a UE implementer and/or by the network (e.g. through signalling).

Example 1C: Measurement Across Different Frequencies and/or Frequency Bands

In some case, the time-limited interference can be wideband, spanning multiple frequencies.

In an example, the UE measures (1) a noise level and/or (2) SNR/LLRs (or any other suitable detection technique) over more than one operating frequencies or operating frequency bands. For example, the measurements can in some cases be carried out on one or more frequency resources which correspond to a frequency band in which the terminal is currently operating, e.g. a band for a downlink channel. In other cases, the measurement can additionally or alternatively be made on frequency resources that are outside a frequency band on which the terminal is currently operating, for example the frequency band of an active downlink channel that the terminal is using.

If these measurements show an increase in noise or a reduction in SNR/LLR at more than one frequency resource, e.g. inside and outside a current active operating frequency band of the terminal, then time-limited interference can be declared as having been detected.

Example 1D: Machine Learning

In an example, the UE can implement a machine learning (ML) algorithm for detecting interference. The ML algorithm can be trained with sets of training data consisting of signal samples, noise samples, or other internal signals that the terminal can obtain for determining whether it is experiencing time-limited interference. In one example, the algorithm or model is trained using signals within the modem of a mobile station and applied using corresponding signals as input(s). The training data can be labelled as being either associated with noise or as being associated with time-limited interference such that the machine learning module can create a model for detecting time-limited interference. The ML module can be trained once before being used and it can also be updated later based on additional training data.

It is also noteworthy that the ML module may be also trained to predict time-limited interference, using other types of training data which may not necessarily be related to signals within the UE modem or to a condition or measurements related to the mobile network. Indeed, some interference events are associated with something changing in the environment outside of the mobile network.

For example, the training data could comprise video or still images of the factory within which the UE is installed and this data can be used as an additional data source for training and inference by the ML module. As an illustration, if the operation of a neighbouring welding robot can cause time-limited interference, the ML algorithm and module may learn to recognise that some images (e.g. representing a robotic arm in a welding position) are strongly associated with time-limited interference and can thus be trained to detect time-limited interference based on video images of the setting within which the UE is deployed.

Such data may also be used without the use of mobile network related data. In one example, the ML module may use, in both the training and inference phases, both mobile network related data and external data, such as the video/still images discussed above, in order to detect time-limited interference. In another example, the ML module may use only the external data in order to detect time-limited interference.

In some cases, the ML module may provide an output which can be used when determining whether time-limited interference is detected or not. Using the example above, if the ML module detects that the welding arm is in welding position and that based on the timing and movement of the arm, welding (and thus time-limited interference) is expected at a particular point in time, the ML module can output information to that effect that can be used to supplement other interference detection mechanisms. The output can for example be or be used to increase a likelihood of detecting time-limited interference.

Examples of external data that may be used to determine the presence of time-limited interference (solely or as a supplement to mobile data) include one or more of: image data, video data, temperature sensor data, humidity data, pressure data, wind speed data, movement detection data, luminosity data, vibration data, noise data, etc.

Accordingly, a machine learning module may be trained and used to detect time-limited interference—on its own or in combination with one or more other techniques.

Based on the output of the appropriately-trained ML algorithm and module, the UE can thus declare or determine whether time-limited interference has been detected or not.

Example 1E: Notification/API

In some cases, a piece of industrial equipment (such as a welding robot) may be aware of when it might create interference. For example, when the industrial equipment is about to perform a weld, it could determine that it is about to create interference.

In an example technique, an application programming interface (API) or other notification system may be provided for the industrial equipment to report a time-limited interference event.

The UE can be notified (directly or indirectly) of the occurrence of time limited interference and may then report to the network accordingly, if appropriate.

In one example, a UE may be connected to the industrial equipment. For example, the UE may be in direct communication with the piece of industrial equipment (which may be through a wireless or wired connection, as appropriate). The API may be provided on the UE for the other devices to notify the UE.

In another example, the API may be provided through an intermediate node (e.g. a server) wherein notifying devices can use the API to notify of an interference-inducing event. The intermediate node may then notify any relevant UE, for example UEs that are determined to be in a geographical location where the interference will have a negative impact. In this case, the notification is indirect but the UE is still notified of the time-limited interference by the notifying device.

Example 1F: Estimation of Parameters of Detected Time-Limited Interference

In some examples, a UE may estimate whether time-limited interference is occurring or not based on data that does not relate to mobile network signals or operations. For example such data can include one or more of: image data, video data, temperature sensor data, humidity data, pressure data, wind speed data, movement detection data, luminosity data, vibration data, noise data, etc.

For example, when the time-limited interference occurs due to the operation of a neighbouring welding robot, the UE may be able to detect or estimate the occurrence of time-limited interference. This can be reported to the base station. For example, when the UE has a camera to monitor the surrounding situation, the UE can estimate whether the time-limited interference is occurring or not based on the monitored operation of a neighbouring welding robot. This detection may use a ML module as discussed above, although the present disclosure is not limited to a ML detection and other less advanced detection techniques may also be used.

In such cases, the UE can sometimes also estimate the time duration that the time-limited interference will occur for. The UE can also report an estimate of the duration of the time-limited interference.

In some cases, the UE can also estimate the start time and/or the end time of the time-limited interference. For example, if an ML-based vision system observes the location and velocity of movement of a welding robot, it can predict when the weld will occur and hence when the time-limited interference will be generated. This can also be estimated using a non-ML module, which can determine that welding is occurring when the arm is in or near a welding position and when a measured luminosity and/or temperature around the welding area increases suddenly and/or increases above corresponding threshold values. The UE can thus sometimes estimate the start time of the time-limited interference.

Furthermore, the UE may be able to estimate the magnitude or severity of the time-limited interference based on the monitoring of neighbouring equipment and/or of neighbouring sensors.

This example detection technique can be used in combination with one or more of the above examples, such as the notification/API example and the machine learning example.

Hence in this example, the UE reports one of more parameters related to the estimated time-limited interference, where the estimated parameters comprise one or more of the time-duration of the time-limited interference, the start time of the time-limited interference or the severity of the time-limited interference.

It is pointed out that in some examples, the short lived interference can be measured using methods similar to the ones used for background noise as a starting point. The measurement methods can then for example be configured with or modified to use one or more appropriate parameters that correspond or reflect the time dimension determination, or the measurements can then be processed to determine whether they are indicative of time-limited interference. Current methods treat all interference as background noise and therefore fail to provide any mechanisms for detecting characteristics of the interference in a time dimension, for example whether the interference represents a peak in interference rather than a broadly stable level of interference. Additionally or alternatively, different methods might be used for detecting short-lived interference compared to methods used for measuring the level of background noise.

Item 2. UE Reporting of Time-Limited Interference Detection.

This section focusses on techniques that might be implemented to report on the fact that the UE has determined that time-limited interference has occurred or is occurring.

Example 2A. 2-Level NACK

Where time-limited interference is detected, it can be desirable to report it at the same time or substantially the same time as a NACK is transmitted. In particular, if the terminal reports that a downlink transmission has been unsuccessfully received when the downlink transmission occurred over a time period that is near (and preferably, is expected to overlap or to potentially overlap) a time period where time-limited interference is detected, then the base station (or more generally the mobile node which is in communication with the UE, e.g. which sent this downlink transmission) can follow a different process compared to a NACK received when time-limited interference is not detected or is not believed to have occurred.

As mentioned above, NACKs can for example have a significant effect on the CQI outer loop (see FIGS. 6-7 and their discussion). It can thus be desirable for the base station to know that there has been time-limited interference when the UE reports NACK.

In this example, the UE can use the ACK/NACK messages to report at the same time any time-limited interference detection. For example, a UE may use two forms of negative acknowledgement messages (e.g. NACKs sent on the uplink via the Physical Uplink Control CHannel "PUCCH"):

"normal" NACK: This NACK relates to error events that are associated with normal SNR-related noise or background interference (see discussion of "$BLER_{SNR}$" below). The base station could use these error events to update CQI outer loop operation.

"time-limited interference" NACK: This NACK relates to error events that are associated with time-limited interference. The UE could send this type of NACK when time limited interference is detected (e.g. when an interference_detected flag is triggered, as discussed in the text above related to item 1). The base station can then for example not use such a NACK to update the CQI outer loop, but it might take other actions, as described further below.

For example, the "time-limited interference" NACK may be used in a conventional way from the perspective of transmission and retransmission control (e.g. both types of NACK can still result in a retransmission of the unsuccessfully received transmissions) but may be used differently when it comes to determining transmission parameters, e.g. in a CQI outer loop, resource allocation or handover instructions.

In one example, the ACK/NACK signalling can be encoded as a 2-bit field. For example, an example encoding for ACK and NACK according to this example is illustrated in Table 1 below.

TABLE 1

| Bit string | ACK/NACK status |
| --- | --- |
| 00 | ACK |
| 01 | Reserved |
| 10 | Normal NACK |
| 11 | Interference NACK |

Example 2B. Scrambling Code

In one example, the UE can use a different scrambling code for the case where a NACK occurs due to time-limited interference compared to a negative acknowledgement when no time-limited interference is detected.

In this case, one of two scrambling codes can be applied to the transmission of a negative acknowledgement message, e.g. NACK message: $SC_{normal}$ and $SC_{interference}$.

An example of the utilisation of such two different scrambling codes is illustrated in Table 2 below.

TABLE 2

| Scrambling code | ACK/NACK status |
| --- | --- |
| $SC_{normal}$ | ACK; normal NACK |
| $SC_{interference}$ | Interference NACK |

In most cases it is expected that time-limited interference will not be experienced or found. Accordingly, in the example of Table 2, the base station (or network node) can attempt to decode ACK/NACK status based on the default scrambling code, $SC_{normal}$, first. The base station only needs to attempt to decode ACK/NACK status based on the second scrambling code, $SC_{interference}$, in cases where it failed to decode the message based on the default scrambling code, $SC_{normal}$. This will be in a case when time-limited interference was detected by the terminal and the corresponding scrambling code was used.

Example 2C. Uplink Resource Selection

In an example related to example 2A, the UE can make a different resource selection for the case where a NACK occurs due to time-limited interference compared to a conventional or default case where time-limited interference has not been detected. For example, if the UE needs to send an uplink transmission (e.g. ACK/NACK or other), it can select which uplink resources to use depending on whether time limited interference was detected.

For example, if the terminal intends to use a PUCCH resource (or more than one if appropriate), there can be two PUCCH resources that are reserved for UE ACK/NACK status reporting: PUCCH1 and PUCCH2 and the UE can then for example use PUCCH according to the following rules:

PUCCH1. Used for ACK or when there is a normal/default NACK (i.e. NACK without time-limited interference).

PUCCH2. Used for interference NACK (i.e. NACK with time-limited interference).

As the skilled person will appreciate, using this technique for transmitting ACK/NACK messages is particularly helpful as it can be desirable to obtain time-limited interference detection information at the same time as a NACK is reported.

However, this uplink resource selection technique may additionally or alternatively be used for transmitting any other types of uplink messages.

More generally, the reporting of time-limited interference may be—but is not necessarily—associated with an ACK/NACK transmission, as will be even clearer from the discussion below.

Example 2D. Channel State Information Report

In this example, the interference status can be sent as part of a report on channel state information (CSI).

In current systems, the terminal will send CSI reports to the network. Such CSI can be adapted to report time-limited interference.

For example, a channel state report can be modified as discussed below.

In a first example, the channel state report may be modified to include an additional field. The interference status can be indicated as an explicit bit (or more, if appropriate) field within a channel state report, e.g. in a CSI report.

Additionally or alternatively, one of the entries within a channel state information report can be re-purposed to indicate the detection of time limited interference. For example, current CSI reports are mostly for communicating about a channel quality, represented by a Channel Quality Indicator (CQI). Table 3 below, based on Table 5.2.2.1-2 of 3GPP TS 38.214 [4], illustrates how the CQI (or any other channel quality or link quality indicator) reporting can be used to report on time-limited interference at the same time.

TABLE 3

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | | Interference | |

In this example, if the UE determines that it experiences time-limited interference, it can send a report using CQI Index 15. It should be noted that if there is time-limited interference, it is likely that it would be challenging to find a suitable or appropriate Physical Downlink Shared Channel (PDSCH) MCS. This is because the interference would likely cause a PDSCH NACK irrespective of the MCS used. Accordingly, using a specific CQI Index that precludes simultaneous indication of a particular MCS is an acceptable limitation in these circumstances.

Such a CSI report can be sent periodically or aperiodically. In either case, the interference status reported in the CSI report can be selected based on—and considered as applying to—the time period between the current CSI report and the previous report.

Accordingly, if the periodicity of CSI reports is 4 slots, the base station can assume that the 4 slots prior to a CSI report that indicates "interference" were potentially all subject to time-limited interference. The base station can then take this information into account. For example it can take this into consideration in its CQI outer loop operation: the base station can for example go back or "backtrack" on any CQI outer loop adjustments made during the period where the UE was believed to be affected by time-limited interference.

In another example, if the UE detects time-limited interference, it can try to assess the level of time-limited interference so as to estimate what measurements would have been without the time-limited interference. For example, the terminal can try to determine the CQI that would have been reported if the time-limited interference had not occurred, such that the CSI is reported with a "clean" CQI, to the best of the terminal's estimations and calculations. In such an example, as the CQI or CSI is selected based on the time-limited interference being disregarded, the UE may wish to additionally indicate the presence of time-limited interference. This can be done using any one or more of the previous or later reporting examples. For example, one arrangement may be implemented in accordance with example 2D above where the UE uses an explicit bit field to indicate the presence of time-limited interference. In such a case, the UE can send this explicit indication of time-limited interference and can also send a report of the "clean" CQI.

In another example, an out of range value (e.g. CQI index 0 in the current CQI table, as shown in Table 5.2.2.1-2 of 3GPP TS 38.214 [4] or in Table 3 above) may be used to indicate time-limited interference.

Example 2E. Different Channel

In this example, the time-limited interference status can be reported using a separate channel, namely a channel that is different from the uplink control or data channels available for the UE to communicate with the network, such as a PUSCH or PUCCH. In some examples, the channel may be dedicated for reporting interference-related signalling.

Example Channel Structures Include:
PRACH-based reporting: this can allow a UE to report interference even when it is not allocated UL resource and when no uplink communication channel is established, e.g. when the UE is not in active communication with a network node.
Wideband CDMA. The interference report could be transmitted as a wideband CDMA channel, such a 3G channel or another WCDMA channel (e.g. that may not comply with the 3G standards). A wideband CDMA (spread spectrum) signal is expected to be more robust or resistant to narrowband interference as the narrowband interference is spread across the whole system bandwidth. Accordingly, using such a Wideband CDMA channel may be appropriate to use when the time-limited interference is narrowband.

In a related example, multiple UEs could use the same separate channel to report time-limited interference. The base station or network node can then take mitigating action based on the reporting on this channel, e.g. if any UE reported time-limited interference or if at least a minimum number of UEs have reported time-limited interference during a period of time.

Example 2F. Different Carrier/Frequency

In this example, the interference report is carried using a different carrier frequency to the one where the time-limited interference was observed.

The base station or network node would then monitor this reporting carrier frequency in addition to the carrier frequencies that are otherwise used. This example can bring an increased robustness in the reliability of the reporting. It might be difficult to encode and safely transmit an interference report message on a carrier on which interference has been observed. Accordingly, sending that time-limited interference report on another carrier that is not being interfered with can have its benefits.

Item 3. What the Base Station does if there is Time-Limited Interference.

If there is time-limited interference observed or detected at the UE (e.g. see item 1) and the base station or network node have been informed about that time-limited interference (e.g. see item 2), the base station or network node may take mitigating action in response to receiving the time-limited interference report.

Examples of such mitigating actions are provided and discusses below.

Example 3A. Base Station does not Update the CQI Outer Loop

In this example, when the base station receives a NACK that is associated with interference (e.g. according to one of the examples for item 2 above), the UE does not update its CQI outer loop. In this way, the system is more likely to achieve the $BLER_{SNR}$ target.

It is noteworthy that the overall BLER target might not be achieved according to this example even if the $BLER_{SNR}$ is achieved as the overall BLER target will correspond to $BLER_{total}=BLER_{SNR}+BLER_{interference}$ and there may be additional block errors associated with the time-limited interference.

In accordance with the present disclosure, two different types of BLER targets or measures can be considered. Currently typically only one BLER target is used in a conventional mobile network. The proposed types of BLER targets or measures are discussed below:

- $BLER_{SNR}$: this target is for reflecting block errors that are random in nature and that are dependent on the signal to noise ratio (or the signal to background interference ratio). These block errors can be controlled by either changing the signal to noise ratio or by choosing a more appropriate MCS for the SNR. This corresponds to the BLER target that current mobile networks typically aim to achieve.
- $BLER_{interference}$: this target is for reflecting block errors that occur when there is time-limited interference. These block errors would occur regardless of the MCS chosen for the SNR.

By having two different types of BLER target and by differentiating between the two, the system can handle time-limited interference in a way that is less detrimental than when the time-limited interference is not treated differently but is managed as if it were part of the background noise or background interference. In particular, it can help the system with isolating or separating the BLER caused by the time-limited interference and with assisting in the achievement of the $BLER_{SNR}$ target more effectively, even in the presence of time-limited interference.

In a related example, when there are NACKs associated with a time period where time-limited interference is detected, the NACKs do not affect the CQI outer loop operation for $BLER_{SNR}$, but $BLER_{SNR}$ itself is adapted such that the overall SNR target is achieved. For example, if the overall BLER target is 10% and it is observed that there is a residual BLER of 3% due to errors related to time-limited interference, the $BLER_{SNR}$ target is updated to be $BLER_{SNR}=7\%$.

In another example, such NACKs may affect the CQI outer loop but to a lesser extent than if no time limited interference is detected. For example when looking at FIG. 7 and its discussion above, a $NACK_{INTERFERENCE}$ may result in a reduction by a portion of the Correction Factor step rather than the full step. For example, the outer loop may implement the following calculation in cases of NACKs:

$NACK_{DEFAULT}$: $CF_{new}=CF_{old}-CF_{step}$ $NACK_{INTERFERENCE}$: $CF_{new}=CF_{old}-\alpha*CF_{step}$, with $0<\alpha,<1$ Accordingly, when time limited interference is detected during a time period, the system may fully or partially disregard channel quality information or transmission success information relating to this time period.

Alternatively or additionally, when the UE receives information that there had historically been time-limited interference (e.g. via a CSI report according to example 2D above), the base station can roll back or "backtrack" on the CQI outer loop updates that it had made, e.g. updates made in time periods affected by time-limited interference. In the backtracking functionality, the base station can for example cancel CQI outer loop updates that were made during a time period where the time-limited interference was detected.

Example 3B: Base Station Uses the Interference Report to Change to a Different Frequency In this example, when the base station is aware that there is time-limited interference at the UE, it can switch to communicating with the UE using a different frequency or frequency band.

For example, the base station could normally communicate to the UE in the 3 GHz frequency range, but if time-limited interference is detected at this frequency, the base station could switch to using a 6 GHz frequency range. The rationale for this example is that it is unlikely that the time-limited interference spans both frequency bands.

This may be particularly useful in cases where the detection is expected to be in real time rather than after the event. For example, if the detection is based (at least in part) on observing the environment around the terminal (e.g. video, sensors, etc.), the system may know when to expect time-limited interference and can take remedial action before or as the interference is happening.

This example could be implemented by one or more of the following methods:

- In a dual connectivity or carrier aggregation case, the UE and base station can use a different carrier frequency at any time. Accordingly, the base station can make the decision to use the different frequency and inform the UE accordingly.
- Handover instruction: when time-limited interference is observed, the base station could issue a handover command to the UE to handover to a different carrier frequency. With this method, the robustness of the handover command is potentially questionable, in particular if it is expected that the handover command itself may be interfered with by the time limited interference. If this is expected to be the case—or in case it might be the case, the base station can mitigate this risk by using a robust MCS for transmission of the handover command for example.
- Automatic re-direction to another frequency (which may be a sub-case of the example above): when the UE connects to the network, or during an ongoing connection with the network, the base station can indicate to the UE which frequency it can or should switch to if it observes time-limited interference. In this sub-example, when the UE sends a signal (e.g. PUCCH) to the base station indicating the presence of time-limited interference or if the time-limited interference level is above a threshold, it can then switch to that other frequency or frequency band and the base station will know which frequency(ies) to monitor. Also, this reduces the risk of having a command for mitigating the interference being corrupted by the very interference it is trying to avoid.

Example 3C: Base Station Uses the Interference Report to Change Waveform

In this example, when the base station is aware that there is time-limited interference at the UE, it can change the waveform that it uses to communicate with the UE.

Example waveforms that the base station could change to in order to improve the operating reliably when there is time-limited interference detected include:

CDMA/spread spectrum waveform: spread spectrum waveforms (for example, a long code CDMA-based waveforms) are expected to be robust to narrowband interference. Accordingly, it may be used for maintaining a more robust connection with the UE when there is time-limited interference detected (e.g. observed or expected).

Frequency hopping. Frequency hopping is also expected to increase robustness to narrowband interference. The base station can then change to using a frequency-hopping based waveform when time-limited interference is detected.

UWB (ultra wideband): UWB waveforms are resilient to interference and could thus also provide a helpful approach to try to reduce the negative impact of time-limited interference when detected.

Example 3D: Handover to a Different Cell

As the skilled person would appreciate, the interference source could be spatially confined. If the UE and base station detect time-limited interference in one spatial direction, the connection to another base station on the same carrier frequency might not be subject to the interference from the same source. Accordingly, when interference is reported from a UE to a base station, the UE can be handed over to a base station in a different location.

Figure 10:
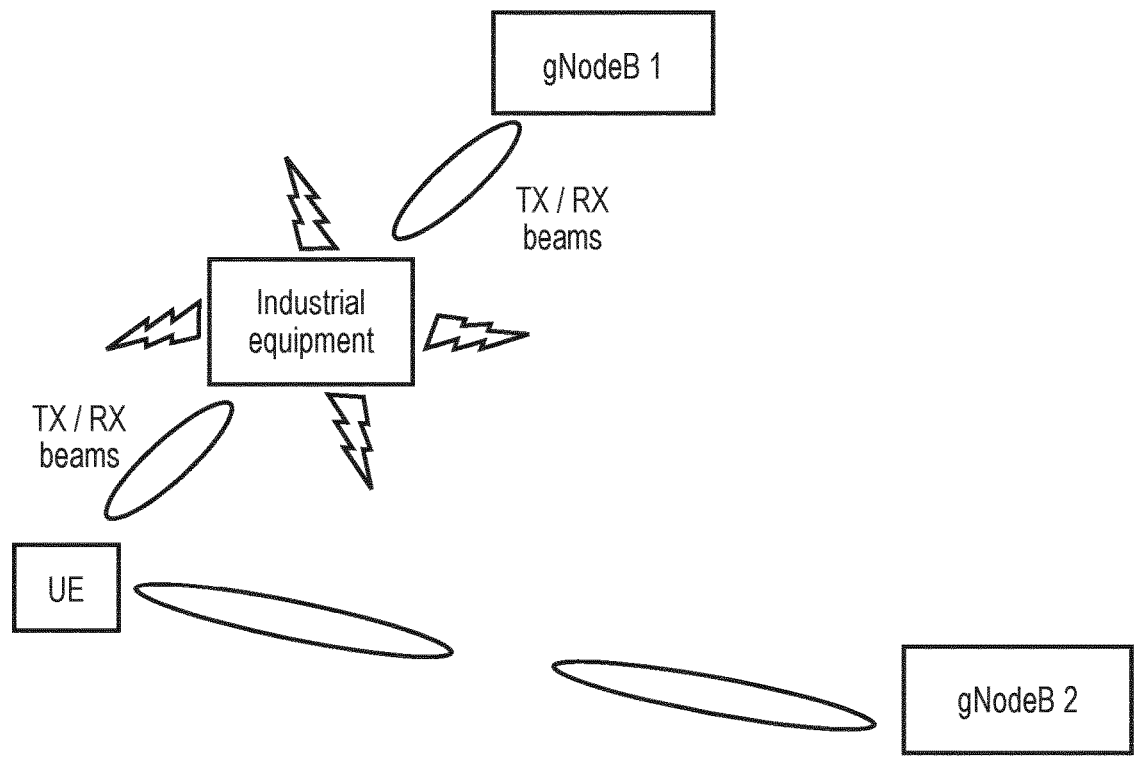
FIG. 10 illustrates an example of how time limited interference may be affecting different transmissions.

FIG. 10 illustrates how time limited interference may be affecting different transmissions and illustrates the following scenario:

gNodeB1: the UE is initially connected to gNodeB 1. This may be the gNodeB that was initially selected by legacy cell selection procedures (e.g. it is the gNodeB with the highest RSRP, Reference Signal Received Power, as measured by the UE).

Industrial equipment: a piece of industrial equipment is located between the UE and gNodeB1 or near the path between the UE and gNodeB1. At a certain point in time, the industrial equipment creates interference, as illustrated in FIG. 10.

UE: the receive beam that the UE uses to receive signals from gNodeB1 is subject to time-limited interference from the industrial equipment that is located between the UE and gNodeB1 or near the path in-between.

gNodeB2: in this example, gNodeB2 is located further from the UE than gNodeB1 and may not for example be the first choice for the UE. However, in this example there is no interference source between the UE and gNdodeB2 and the UE's connection to the gNodeB2 is expected to be little affected by the time-interference from the piece of industrial equipment (the interference source). When the time-limited interference is observed by the UE when it is connected to gNodeB1, it can initiate a handover or cell-reselection to gNodeB2.

In a related example, in some cases and/or under certain conditions, the UE can blacklist or mark a base station that it has previously connected to if that connection was subject to time-limited interference. The black-listed base stations could be stored on the SIM or within the UE. When the UE subsequently connects to the network, it can prioritise non-blacklisted base stations over marked or blacklisted base stations. Also if some base stations can be identified as mildly affected by time-limited interference and some can be identified as strongly affected by time-limited interference, the mildly affected ones can be de-prioritised over the unaffected ones but also prioritised over the strongly affected ones. Strongly affected ones can be prioritised over black-listed ones or can be included in the black list of base stations. Black-listed ones can be for example entirely ruled out and avoided as base stations such that the terminal will not connect to it or they may be used as last resort base stations if no other base station is available. Viewed from a different perspective, the level of time-limited interference experienced by terminals connected to a particular base station can be taken into consideration by the UE and/or network when deciding on whether a terminal should connect to this particular base station or not.

Example 3E. Use of a Different Beam

As per example 3D, the interference source could be spatially confined. If the UE and base station observe time-limited interference in one spatial direction, the connection to another TRP (transmit/receive point) associated with the same base station on the same carrier frequency might not be subject to the interference.

Figure 11:
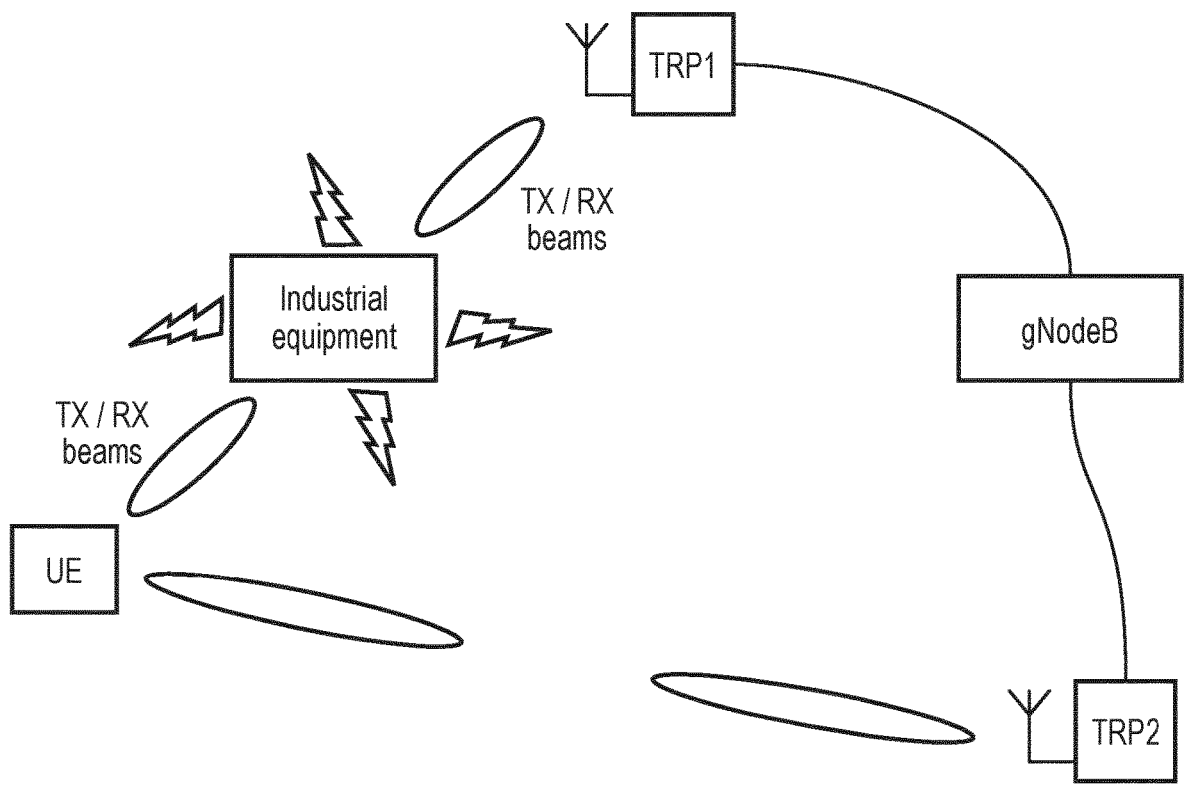
FIG. 11 illustrates another example of how time limited interference may be affecting different transmissions.

FIG. 11 illustrates another example of how time limited interference may be affecting different transmissions. In this example, when interference is reported from a UE to a base station, the UE initiates a beam management procedure to operate using TX and/or RX beams in the direction of a different TRP. FIG. 11 illustrates the following scenario:

gNodeB: The gNodeB is connected to two spatially separated TRPs, TRP1 and TRP2.

TRP1: The UE is initially connected to gNodeB1, for example as the first best candidate for a good quality link with the UE, through a beam associated with TRP1.

Industrial equipment: a piece of industrial equipment is located between the UE and TRP1 or near the path between the two. At a certain point in time, the industrial equipment creates interference, as illustrated in FIG. 11.

UE: the UE is originally connected to TRP1 and the receive beam that the UE uses to receive signals from the gNodeB via TRP1 is then subject to time-limited interference from the industrial equipment.

TRP2: there is no interference source between the UE and TRP2 or near the path between these two elements. Accordingly and even though the performance of TX/RX beams with TRP2 may be inferior to the performance with TRP1 (without interference), when the time-limited interference is detected (e.g. observed or expected) by the UE while it is connected to the gNodeB via TRP1, it can initiate a beam management procedure to instead use a beam associated with TRP2.

For examples 3D and 3E, location may be used to determine whether a handover to another base station or beam is expected to be helpful or not. For example, it may be based on predetermined or map location information (e.g. location of devices, TRPs, base stations, known interference sources, etc.) and/or on inferred location information (e.g. UEs connected to TRP1 or gNobeB1 report time-limited interference but not the ones connected to TRP2 or gNodeB2, or not to the same extent, such that the latter must be geographically removed from the interference and thus be appropriate handover candidates or appropriate candidates for beam/TRP selection).

Example 3F. Evaluate Time-Limited Interference

By nature, time-limited interference is temporary and the mitigation techniques that may be implemented can thus also be a temporary. For example, any of the examples above may be used for a limited time.

A terminal may for example be requested to handover back to the original base station or TRPs once it is expected that the time-limited interference is no longer occurring.

In another example, the base station can evaluate or assess the duration or expected duration of the time-limited interference.

If it is deemed that the interference is short, it can for example elect not to move the UE to another resource (as per above examples, e.g. another cell) and to wait for the interference levels to reduce. It can however use other mitigation techniques, for example disregarding a NACK (fully or partially) when reporting on a channel quality link to a network node. The system can also thereby avoid loading other cells/frequency and increasing an amount of signalling to be exchanged, with the signalling associated with the handover.

However, if the time-limited interference duration is expected to be longer, for example to exceed a threshold, the UE may be moved to another resource (e.g. by the base station). The base station can also move these UEs back once it is determined that the time-limited interference has subsided in the original resource (e.g. original cell and/or frequency resources used for the downlink and/or uplink transmissions for the UE).

Accordingly, with teachings and techniques provided herein, time-limited can be identified by the terminal and can be reported to the network. Accordingly, the network can make decision(s) regarding communication parameters (frequency, modulation scheme, handover etc.) which reflect the detection of time limited interference. In particular, compared to cases where time limited interference is not detected, negative acknowledgement reports and other reporting information indicative of a transmission or channel quality can be fully or partially disregarded.

In accordance with the present disclosure, communications devices, infrastructure equipment and methods therefor, and circuitry for a communications device and circuitry for infrastructure equipment can also be provided.

It will be appreciated that while the present disclosure has in some respects focused on implementations in a 5G or NR network as such a network is expected to provide the primary use case at present, the same teachings and principles can also be applied to other wireless telecommunications systems. Thus, even though the terminology used herein is generally the same or similar to that of the 5G (or LTE) standards, the teachings are not limited to the present versions 5G (or LTE) and could apply equally to any appropriate arrangement not based on 5G/LTE, for example any arrangement possibly compliant with any future version of an LTE, 5G or other standards—defined by the 3GPP standardisation groups or by other groups.

It will be appreciated that the principles described herein are not applicable only to certain types of communications device, but can be applied more generally in respect of any types of communications device, for example while the techniques are expected to be particularly useful for URLLC and/or IoT devices or other low latency communications devices, the skilled person will appreciate that they can also be applied more generally, for example in respect of any type of communications device operating with a wireless link to the communication network, or for peer-to-peer transmissions (either transmissions ending at another node of the radio access network, e.g. a communication device or any other type of node in the network, or transmissions to or from the main or core network and going through a mesh network in the radio access network).

It will further be appreciated that the principles described herein are applicable not only to 5G/NR-based wireless telecommunications systems, but are applicable for any type of wireless telecommunications system.

Further particular and preferred aspects of the present invention are set out in the accompanying independent and dependent claims. It will be appreciated that features of the dependent claims may be combined with features of the independent claims in combinations other than those explicitly set out in the claims, so long as they are technically plausible and feasible.

Thus, the foregoing discussion discloses and describes merely illustrative examples of the present disclosure and this disclosure is intended to be illustrative, but not limiting of the scope of the invention. The disclosure, including any readily discernible variants or equivalents of the teachings herein, define, in part, the scope of the foregoing claim terminology such that no inventive subject matter is dedicated to the public.

Also, while the examples above have been described using the example of communications between a terminal and a base station, the skilled person will appreciate that the communications may be between a terminal and one or more of: a base station, a TRP, a RRH (Remote Radio Head), a mobile terminal (e.g. connected through a side-link or PC5 interface), a relay, any radio access network node or more generally any other mobile node.

Also even in cases where the communications can viewed from the perspective of being between a terminal and a base station or mobile node, in some cases the communications may be sent through another network node, for example a relay or a next hop toward the (destination) network node.

Respective features of the present disclosure are defined by the following numbered clauses:

Clause 1. A method of reporting interference in a mobile telecommunications network, the mobile telecommunications network comprising a mobile terminal and a network node providing a wireless access interface to at least the mobile terminal, the method comprising:
  the mobile terminal performing measurements of interference on one or more frequency resources of the wireless access interface;
  based on the measurements, the mobile terminal determining that the measured interference comprises time-limited interference by determining whether the measured interference comprises interference limited in time;

upon determining that the measured interference comprises time-limited interference, the mobile terminal reporting to the network node the detection of the time-limited interference.

Clause 2. The method of any preceding clause wherein determining that the measured interference comprises time-limited interference comprises determining that the measured interference comprises time-limited interference having a duration time of less than a predetermined time, the predetermined time being of 0.1, 0.5, 1, 5, 10 or 20 milliseconds and/or being in a [0.1 ms-20 ms] range.

Clause 3. The method of any preceding clause wherein determining that the measured interference comprises time-limited interference comprises determining whether the measured interference corresponds to background noise or corresponds to time-limited interference.

Clause 4. The method of any preceding clause further comprising the mobile terminal transmitting to the network node, an interference measurement report based on the measurements.

Clause 5. The method of any preceding clause wherein the mobile terminal is configured, when a transmission from the network node has been unsuccessfully received by the mobile terminal, to transmit a negative acknowledgement message of a first type to the network node, the method further comprising:
 the mobile terminal, upon determining that the measured interference comprises time-limited interference and that a transmission from the network node has been unsuccessfully received by the mobile terminal, transmitting a negative acknowledgement message of a second type to the network node, the second type being different from the first type, thereby reporting the detection of the time-limited interference.

Clause 6. The method of any preceding clause, comprising
 the mobile terminal identifying a transmission for the network node;
 the mobile terminal transmitting to the network node, when the time-limited interference is detected, the identified transmission using a first scrambling code; and
 the mobile terminal transmitting to the network node, when the time-limited interference is not detected, the identified transmission using a second scrambling code, wherein the second scrambling code is different from the first scrambling code.

Clause 7. The method of clause 6, wherein the identified transmission comprises an indication that a previous transmission from the network node has been unsuccessfully received by the mobile terminal.

Clause 8. The method of clause 6 or 7, further comprising the mobile terminal, upon determining that an earlier transmission from the network node has been successfully received by the mobile terminal, transmitting to the network node an acknowledgement message using the second scrambling code.

Clause 9. The method of any preceding clause, comprising:
 The mobile terminal identifying a message to transmit to the network node;
 the mobile terminal selecting, when the time-limited interference is detected, a first set of resources for transmitting the identified message to the network node; and
 the mobile terminal selecting, when the time-limited interference is not detected, a second set of resources for transmitting the identified message to the network node, wherein the second set of resources is different from the second set of resources.

Clause 10. The method of clause 9 wherein the identified message is a message indicating that a previous transmission from the network node has been unsuccessfully received by the mobile terminal.

Clause 11. The method of clause 9 or 10, further comprising the mobile terminal, upon determining that an earlier transmission from the network node has been successfully received by the mobile terminal, selecting the second set of resources for transmitting an acknowledgement message to the network node.

Clause 12. The method of any preceding clause further comprising the mobile terminal transmitting a channel state information report to the network node, wherein
 when the time-limited interference is detected, the mobile terminal transmits a channel state information report of a first type; and
 when the time-limited interference is not detected, the mobile terminal transmits a channel state information report of a second type, the second type of channel state information report being different from the first type of channel state information report.

Clause 13. The method of clause 12, wherein the channel state information report of the first type comprises at least one indicator bit for reporting the time-limited interference detection by the terminal.

Clause 14. The method clause 12 or 13, wherein the channel state information report comprises a channel quality indicator for the terminal to report on the quality of a channel between the terminal and the network node, the method further comprising:
 the mobile terminal transmitting, when the time-limited interference is not detected, a channel quality indicator selected from a first range, the first range comprising a plurality of channel quality indicators; and
 the mobile terminal transmitting, when the time-limited interference is detected, a channel quality indicator selected from one or more indicator values outside the first range.

Clause 15. The method of any preceding clause wherein the one or more frequency resources of the wireless access interface are frequency resources associated with a first downlink channel, the first downlink channel being paired with a first uplink channel,
 wherein the mobile terminal reporting the detection of the time-limited interference comprises the mobile terminal reporting the detection of the time-limited interference using a second uplink channel different from the first uplink channel.

Clause 16. The method of any preceding clause wherein the mobile terminal reporting the detection of the time-limited interference comprises the mobile terminal reporting the detection of the time-limited interference using a random access channel.

Clause 17. The method of any preceding clause wherein the one or more frequency resources of the wireless access interface are associated with a radio access technology different from a wideband CDMA radio access technology; and
 the mobile terminal reporting the detection of the time-limited interference comprises the mobile terminal reporting the detection of the time-limited interference using a wideband CDMA waveform.

Clause 18. The method of any preceding clause wherein:
the one or more frequency resources are in a first frequency band; and
the mobile terminal reporting the detection of the time-limited interference comprises the mobile terminal reporting the detection of the time-limited interference using a second frequency band different from the first frequency band.

Clause 19. The method of clause 18 wherein the second frequency band does not overlap with the first frequency band.

Clause 20. The method of any preceding clause wherein the mobile terminal determining that the measured interference comprises time-limited interference comprises
the mobile terminal calculating a first interference level with a duration of a first time period;
the mobile terminal calculating a second interference level with a duration of a second time period, the second time period being shorter than the first time period; and
determining that that the measured interference comprises time-limited interference when the second interference level is greater than the first interference level by at least a predetermined threshold.

Clause 21. The method of any preceding clause wherein the mobile terminal determining that the measured interference comprises time-limited interference comprises:
the mobile terminal measuring a signal-to-noise ratio for a plurality of sampling time periods,
determining that that the measured interference comprises time-limited interference when the rate of change of the signal-to-noise ratio during the plurality of sampling time periods is greater than an expected rate of change by at least a selected threshold.

Clause 22. The method of clause 21, further comprising determining the expected rate of change for the signal-to-noise ratio based on one or more of:
a rate of change for the signal-to-noise ratio for a reference time period, the reference time period being longer than the sampling period;
a preconfigured rate of change;
a predetermined rate of change signalled to the mobile terminal.

Clause 23. The method of any preceding clause comprising:
the mobile terminal identifying a set of one or more signal measurements based on measuring one or more of: signal samples, noise samples or other internal signals for the one or more frequency resources; and
the mobile terminal determining whether the identified set of one or more signal measurements is indicative of time-limited interference using a model, the model being generated using a plurality of training sets of one or more signal measurements wherein each of the set of the plurality of training sets is associated with one of a presence of time-limited interference or an absence of time-limited interference.

Clause 24. The method of any preceding clause comprising the mobile terminal receiving a time-limited interference indication notifying the mobile terminal of the occurrence of time-limited interference,
wherein detecting the time-limited interference is based on receiving the time-limited interference indication.

Clause 25. The method of any preceding clause wherein the mobile terminal comprises a detection module configured to estimate a likelihood of detecting time-limited interference and configured to output a likelihood indication based on an estimated likelihood of detecting second interference, wherein detecting the second interference is based on outputted likelihood indication.

Clause 26. The method of any preceding clause wherein the network node is configured to determine one or more transmission parameters for communicating with the mobile terminal based on mobile terminal feedback received from the terminal, the method further comprising:
the network node receiving a report of time-limited interference detection from the mobile terminal, the report of time-limited interference detection corresponding to a detection window; and
upon receipt of the report of time-limited interference detection, the network node determining the one or more transmission parameters by partially or fully disregarding mobile terminal feedback corresponding to a feedback window overlapping with the detection window.

Clause 27. The method of clause 26 wherein the one or more transmission parameters comprise one or both of (i) a modulation and coding scheme and (ii) a target block error rate.

Clause 28. The method of clause 26 or 27 wherein the mobile terminal feedback comprises one or more of:
a report based on measurements of a link between the mobile terminal and the network node;
a link quality indicator received from the terminal; and
a positive or negative acknowledgement for a transmission from the network node to the mobile terminal.

Clause 29. The method of any preceding clause comprising, upon receipt of a report of time-limited interference detection from the mobile terminal, the network node partially or fully disregarding a report of an unsuccessful previous transmission of a communication between the network node and mobile terminal.

Clause 30. The method of clause 29 wherein the network node is configured to update a target block error rate for transmissions with the mobile terminal taking into account the report of an unsuccessful previous transmission of a communication received from the mobile terminal, the method further comprising:
the network node maintaining or partially updating the target block error rate for the mobile terminal when the report of an unsuccessful previous transmission is received for a time window corresponding to the received report of time-limited interference detection.

Clause 31. The method of clause 29 or 30 wherein the report of an unsuccessful previous transmission of a communication is a negative acknowledgement in a hybrid automatic repeat request system.

Clause 32. The method of any preceding clause comprising the network node, upon receipt of a report of time-limited interference detection, taking a remedial action, the remedial action comprising one or more of:
a modification of a frequency band for communications between the mobile terminal and the network node;
an addition of a frequency band for communications between the mobile terminal and the network node;
a change in the waveform used for communications between the mobile terminal and the network node; and
an instruction for the mobile terminal to handover to another cell provided by the network node or by another network node of the mobile telecommunications communication network.

Clause 33. The method of any preceding clause comprising:
the mobile terminal receiving an indication of a selected frequency band for the mobile terminal to use in the event that time-limited interference is detected;
upon detection of the time-limited interference, the mobile terminal using the selected frequency band for communicating with the network node.

Clause 34. A method of operating a network node in a mobile telecommunications network, the mobile telecommunications network comprising a mobile terminal and the network node, the network node providing a wireless access interface to at least the mobile terminal, the method comprising the network node:
receiving a report of time-limited interference detection from the mobile terminal, the time-limited interference corresponding to interference limited in time; and
taking a remedial action based on receiving the report of time-limited interference detection.

Clause 35. The method of clause 34, wherein the network node is configured to determine one or more transmission parameters for communicating with the mobile terminal based on mobile terminal feedback received from the terminal, wherein the report of time-limited interference detection corresponding to a detection window, the method further comprising:
upon receipt of the report of time-limited interference detection, the network node determining the one or more transmission parameters by partially or fully disregarding mobile terminal feedback corresponding to a feedback window overlapping with the detection window.

Clause 36. The method of clause 35 wherein the one or more transmission parameters comprise one or both of (i) a modulation and coding scheme and (ii) a target block error rate.

Clause 37. The method of clause 35 or 36 wherein the mobile terminal feedback comprises one or more of:
a report based on measurements of a link between the mobile terminal and the network node;
a link quality indicator received from the terminal; and
a positive or negative acknowledgement for a transmission from the network node to the mobile terminal.

Clause 38. The method of any one of clauses 34 to 37 comprising, upon receipt of the report of time-limited interference detection, the network node partially or fully disregarding a report of an unsuccessful previous transmission of a communication between the network node and mobile terminal.

Clause 39. The method of any one of clauses 34 to 38 wherein the network node is configured to update a target block error rate for transmissions with the mobile terminal taking into account a report of an unsuccessful previous transmission of a communication received from the mobile terminal, the method further comprising:
the network node maintaining or partially updating the target block error rate for the mobile terminal when the report of an unsuccessful previous transmission is received for a time window corresponding to the received report of time-limited interference detection.

Clause 40. The method of clause 38 or 39 wherein the report of an unsuccessful previous transmission of a communication is a negative acknowledgement in a hybrid automatic repeat request system.

Clause 41. The method of any one of clauses 34 to 40 wherein the remedial action comprising one or more of:
a modification of a frequency band for communications between the mobile terminal and the network node;
an addition of a frequency band for communications between the mobile terminal and the network node;
a change in the waveform used for communications between the mobile terminal and the network node; and
an instruction for the mobile terminal to handover to another cell provided by the network node or by another network node of the mobile telecommunications communication network.

Clause 42. The method of any one of clauses 34 to 41 further comprising transmitting to the mobile terminal an indication of a selected frequency band for the mobile terminal to use in the event that time-limited interference is detected;
wherein the remedial action comprises, upon receipt of the report of time-limited interference detection, switching to the selected frequency band for communicating with the mobile terminal.

Clause 43. A method of detecting interference in a mobile telecommunications network, the mobile telecommunications network comprising a mobile terminal and a network node providing a wireless access interface to at least the mobile terminal, the method comprising operating the mobile terminal in accordance with any one of clauses 1 to 33 and operating the network node in accordance with any one of clauses 34 to 42.

Clause 44. A method of detecting interference in a mobile telecommunications network, the mobile telecommunications network comprising a mobile terminal and a network node providing a wireless access interface to at least the mobile terminal, the method comprising:
the mobile terminal performing measurements of interference on one or more frequency resources of the wireless access interface;
based on the measurements, the mobile terminal determining that the measured interference comprises time-limited interference by determining whether the measured interference comprises interference limited in time;
upon determining that the measured interference comprises time-limited interference, the mobile terminal reporting to the network node the detection of the time-limited interference; the network node receiving a report of the time-limited interference detection from the mobile terminal; and
the network node taking a remedial action based on receiving the report of the time-limited interference detection.

Clause 45. The method of any preceding clause wherein the wireless access interface is in accordance with one or more of: a 3GPP radio access technology, a Long Term Evolution "LTE" technology, a New Radio "NR" technology, a 4G technology, a 5G technology and a mobile network radio access technology.

Clause 46. The method of any preceding clause wherein the network node comprises one or more of: a base station, a gNB, a Remote Radio Head "RRH", a Transmission Reception Point "TRP", a second mobile terminal, a node operable to provide a wireless interface to the mobile terminal.

Clause 47. A mobile terminal for use in a mobile telecommunications network, the mobile telecommunications network comprising the mobile terminal and a network node providing a wireless access interface to at least the mobile terminal, the mobile terminal being configured to communicate with the network node via the wireless access interface and being configured to:
  perform measurements of interference on one or more frequency resources of the wireless access interface;
  based on the measurements, determine that the measured interference comprises time-limited interference by determining whether the measured interference comprises interference limited in time; and
  upon determining that the measured interference comprises time-limited interference, report to the network node the detection of the time-limited interference.

Clause 48. A mobile terminal for use in a mobile telecommunications network, the mobile telecommunications network comprising the mobile terminal and a network node providing a wireless access interface to at least the mobile terminal, the mobile terminal being configured to communicate with the network node via the wireless access interface and being configured to implement the method of operating the mobile terminal in accordance with any one of clauses 1 to 33

Clause 49. Circuitry for a mobile terminal for use in a mobile telecommunications network, the mobile telecommunications network comprising the mobile terminal and a network node providing a wireless access interface to at least the mobile terminal, the circuitry comprising:
  transmitter circuitry configured to transmit signals via the wireless access interface,
  receiver circuitry configured to receive signals via the wireless access interface, and
  controller circuitry configured to control the transmitter and the receiver to:
  perform measurements of interference on one or more frequency resources of the wireless access interface;
  based on the measurements, determine that the measured interference comprises time-limited interference by determining whether the measured interference comprises interference limited in time;
  upon determining that the measured interference comprises time-limited interference, report to the network node the detection of the time-limited interference.

Clause 50. A network node for use in a mobile telecommunications network, the mobile telecommunications network comprising a mobile terminal and the network node, the network node being configured to provide a wireless access interface to at least the mobile terminal and being further configured to:
  receive a report of time-limited interference detection from the mobile terminal, the time-limited interference corresponding to interference limited in time; and take a remedial action based on receiving the report of time-limited interference detection.

Clause 51. A network node for use in a mobile telecommunications network, the mobile telecommunications network comprising a mobile terminal and the network node, the network node being configured to provide a wireless access interface to at least the mobile terminal and being further configured to operate in accordance with any one of clauses 34 to 42.

Clause 52. Circuitry for a network node for use in a mobile telecommunications network, the mobile telecommunications network comprising a mobile terminal and the network node, the network node being configured to provide a wireless access interface to at least the mobile terminal, the circuitry comprising:
  transmitter circuitry configured to transmit signals via the wireless access interface, receiver circuitry configured to receive signals via the wireless access interface, and controller circuitry configured to control the transmitter and the receiver to:
  receive a report of time-limited interference detection from the mobile terminal, the time-limited interference corresponding to interference limited in time;
  take a remedial action based on receiving the report of time-limited interference detection.

Clause 53. A system for detecting interference in a mobile telecommunications network, the mobile telecommunications network comprising a mobile terminal and a network node providing a wireless access interface to at least the mobile terminal, the system comprising at least the mobile terminal and the network node, wherein
  the mobile terminal is configured to:
  perform measurements of interference on one or more frequency resources of the wireless access interface;
  based on the measurements, determine that the measured interference comprises time-limited interference by determining whether the measured interference comprises interference limited in time; upon determining that the measured interference comprises time-limited interference, report to the network node the detection of the time-limited interference; and
  the network node is configured to:
  receive a report of the time-limited interference detection from the mobile terminal; take a remedial action based on receiving the report of the time-limited interference detection.

Clause 54. A system for detecting interference in a mobile telecommunications network, the mobile telecommunications network comprising a mobile terminal and a network node providing a wireless access interface to at least the mobile terminal, the system comprising at least the mobile terminal and the network node, wherein the mobile terminal is in accordance with clause 47 or 48 and wherein the network node is in accordance with clause 50 or 51.

REFERENCES

[1] RP-182090, "Revised SID: Study on NR Industrial Internet of Things (IoT)," 3GPP RAN #81.
[2] Holma H. and Toskala A, "LTE for UMTS OFDMA and SC-FDMA based radio access", John Wiley and Sons, 2009
[3] 3GPP TS 38.321, "Medium Access Control (MAC) protocol specification (Rel-15)", v15.3.0
[4] 3GPP TS 38.214, "NR; Physical layer procedures for data (Release 16)", v16.0.0

What is claimed is:
1. A method of operating a mobile terminal in a mobile telecommunications network, the mobile telecommunications network comprising the mobile terminal and a network node providing a wireless access interface to at least the mobile terminal, the method comprising the mobile terminal:
  performing measurements of interference on one or more frequency resources of the wireless access interface;
  based on the measurements, determining whether the interference comprises time-limited interference;
  when the determining indicates that the interference comprises time-limited interference:
    reporting an indication of detection of the time-limited interference to the network node; and
    transmitting a channel state information of a first type to the network node; and when the determining indicates that the interference does not comprise time-limited interference, transmitting a channel state information of a second type different from the channel state information of the first type to the network node.

2. The method of claim 1, wherein the determining whether the interference comprises time-limited interference includes determining whether the interference comprises time-limited interference having a duration time of less than a predetermined time.

3. The method of claim 1, wherein the determining whether the interference comprises time-limited interference includes determining whether the interference corresponds to background noise or corresponds to time-limited interference.

4. The method of claim 1, further comprising the mobile terminal transmitting, to the network node, an interference measurement report based on the measurements.

5. The method of claim 1, wherein further comprising the mobile terminal:
transmitting, when a transmission from the network node has been unsuccessfully received by the mobile terminal, a negative acknowledgement message of a first type to the network node; and
when the determining indicates that the interference comprises time-limited interference and when a transmission from the network node has been unsuccessfully received by the mobile terminal, transmitting a negative acknowledgement message of a second type to the network node, the second type being different from the first type, thereby reporting the detection of the time-limited interference.

6. The method of claim 1, further comprising the mobile terminal:
identifying a transmission for the network node;
transmitting to the network node, when the time-limited interference is detected, the identified transmission using a first scrambling code; and
transmitting to the network node, when the time-limited interference is not detected, the identified transmission using a second scrambling code, wherein the second scrambling code is different from the first scrambling code.

7. The method of claim 6, wherein the identified transmission includes an indication that a previous transmission from the network node has been unsuccessfully received by the mobile terminal.

8. The method of claim 6, further comprising the mobile terminal transmitting, when the determining indicates that an earlier transmission from the network node has been successfully received by the mobile terminal, an acknowledgement message using the second scrambling code to the network node.

9. The method of claim 1, further comprising the mobile terminal:
identifying a message to transmit to the network node;
selecting, when the time-limited interference is detected, a first set of resources for transmitting the identified message to the network node; and
selecting, when the time-limited interference is not detected, a second set of resources for transmitting the identified message to the network node, wherein the second set of resources is different from the first set of resources.

10. A mobile terminal for use in a mobile telecommunications network including the mobile terminal and a network node which provides a wireless access interface to the mobile terminal, the mobile terminal comprising:
processing circuitry configured to
communicate with the network node via the wireless access interface;
perform measurements of interference on one or more frequency resources of the wireless access interface;
based on the measurements, determine whether the interference comprises time-limited interference;
when the processing circuitry determines that the interference comprises time-limited interference:
report an indication of detection of the time-limited interference to the network node; and
transmit a channel state information of a first type to the network node; and
transmit, when the processing circuitry determines that the interference does not comprise time-limited interference, a channel state information of a second type different from the channel state information of the first type to the network node.

11. The mobile terminal of claim 10, wherein the processing determines whether the interference comprises time-limited interference by determining whether the interference comprises time-limited interference having a duration time of less than a predetermined time.

12. The mobile terminal of claim 10, wherein the processing determines whether the interference comprises time-limited interference by determining whether the interference corresponds to background noise or corresponds to time-limited interference.

13. The mobile terminal of claim 10, wherein the processing circuitry is further configured to transmit, to the network node, an interference measurement report based on the measurements.

14. The mobile terminal of claim 10, wherein the processing circuitry is further configured to:
transmit, when a transmission from the network node has been unsuccessfully received by the mobile terminal, a negative acknowledgement message of a first type to the network node; and
when the processing circuitry determines that the interference comprises time-limited interference and when a transmission from the network node has been unsuccessfully received by the mobile terminal, transmit a negative acknowledgement message of a second type to the network node, the second type being different from the first type, thereby reporting the detection of the time-limited interference.

15. The mobile terminal of claim 10, wherein the processing circuitry is further configured to:
identify a transmission for the network node;
transmit to the network node, when the time-limited interference is detected, the identified transmission using a first scrambling code; and
transmit to the network node, when the time-limited interference is not detected, the identified transmission using a second scrambling code, wherein the second scrambling code is different from the first scrambling code.

16. The mobile terminal of claim 15, wherein the identified transmission includes an indication that a previous transmission from the network node has been unsuccessfully received by the mobile terminal.

17. The mobile terminal of claim 15, wherein the processing circuitry is further configured to transmit, when the processing circuitry determines that an earlier transmission from the network node has been successfully received by the mobile terminal, an acknowledgement message using the second scrambling code to the network node.

18. The mobile terminal of claim 10, wherein the processing circuitry is further configured to:
   identify a message to transmit to the network node;
   select, when the time-limited interference is detected, a first set of resources for transmitting the identified message to the network node; and
   select, when the time-limited interference is not detected, a second set of resources for transmitting the identified message to the network node, wherein the second set of resources is different from the first set of resources.

19. Circuitry for a mobile terminal for use in a mobile telecommunications network including the mobile terminal and a network node which provides a wireless access interface to the mobile terminal, the circuitry comprising:
   communication circuitry configured to communicate with the network node via the wireless access interface; and
   control circuitry configured to
      perform measurements of interference on one or more frequency resources of the wireless access interface;
      based on the measurements, determine whether the interference comprises time-limited interference;
      when the control circuitry determines that the interference comprises time-limited interference, control the communication circuitry to:
         report an indication of detection of the time-limited interference to the network node; and
         transmit a channel state information of a first type to the network node; and
      when the control circuitry determines that the interference does not comprise time-limited interference, control the communication circuitry to transmit a channel state information of a second type different from the channel state information of the first type to the network node.

\* \* \* \* \*